United States Patent
Ha et al.

(10) Patent No.: US 11,589,110 B2
(45) Date of Patent: Feb. 21, 2023

(54) DIGITAL MEDIA SYSTEM

(71) Applicant: AlcaCruz Inc., San Mateo, CA (US)

(72) Inventors: SangYoo Ha, San Mateo, CA (US); Salomon Lee, San Mateo, CA (US)

(73) Assignee: AlcaCruz Inc., San Mateo, CA (US)

( * ) Notice: Subject to any disclaimer, the term of this patent is extended or adjusted under 35 U.S.C. 154(b) by 0 days.

(21) Appl. No.: 17/723,840

(22) Filed: Apr. 19, 2022

(65) Prior Publication Data

US 2022/0248088 A1    Aug. 4, 2022

Related U.S. Application Data

(63) Continuation of application No. 17/046,121, filed as application No. PCT/US2019/026264 on Apr. 8, 2019, now Pat. No. 11,343,568.

(Continued)

(51) Int. Cl.
*H04N 21/4402* (2011.01)
*H04N 21/431* (2011.01)
*H04N 21/4728* (2011.01)

(52) U.S. Cl.
CPC .  *H04N 21/440263* (2013.01); *H04N 21/4316* (2013.01); *H04N 21/440245* (2013.01); *H04N 21/4728* (2013.01)

(58) Field of Classification Search
CPC ...... H04N 19/167; H04N 19/17; H04N 19/46; H04N 19/597; H04N 21/233;

(Continued)

(56) References Cited

U.S. PATENT DOCUMENTS 11,343,568 B2   5/2022   Ha et al.
2004/0061787 A1  4/2004   Liu et al.
(Continued)

FOREIGN PATENT DOCUMENTS

CN    102164273    8/2011
CN    105933726    9/2016
(Continued)

OTHER PUBLICATIONS

"U.S. Appl. No. 17/046,121, Non Final Office Action dated May 27, 2021", 13 pgs.

(Continued)

*Primary Examiner* — Samira Monshi
(74) *Attorney, Agent, or Firm* — Schwegman Lundberg & Woessner, P.A.

(57) ABSTRACT

A digital media system is configured to support any one or more of multiple features with respect to virtual-reality content. Examples of such features include directional picture-in-picture (PIP) windows based on viewing direction, directional audio based on viewing direction, user recommendations based on anomalous viewing times of certain visual features in video content, dynamic adjustment of time-to-live (TTL) durations prior to requesting deletion of video files uploaded to a content distribution network, dynamic adjustment of durations of video files to upload based on network capacity, dynamic adjustment of quantities of video files per set to upload based on network capacity, dynamic resizing of top-depicting or bottom-depicting regions within the picture areas of sets of video files, dynamic resizing of the picture areas themselves within sets of video files, or any suitable combination thereof.

20 Claims, 12 Drawing Sheets

Related U.S. Application Data

(60) Provisional application No. 62/743,083, filed on Oct. 9, 2018, provisional application No. 62/656,149, filed on Apr. 11, 2018.

(58) Field of Classification Search
CPC ............. H04N 21/4316; H04N 21/439; H04N 21/440245; H04N 21/440263; H04N 21/4728; H04N 21/816; H04N 5/45; H04N 21/23439; H04N 21/8106
See application file for complete search history.

(56) References Cited

U.S. PATENT DOCUMENTS

| | | |
|---|---|---|
| 2010/0050082 A1 | 2/2010 | Katz et al. |
| 2010/0188579 A1 | 7/2010 | Friedman |
| 2011/0157327 A1* | 6/2011 | Seshadri ............... H04N 21/235 348/51 |
| 2012/0092348 A1 | 4/2012 | Mccutchen |
| 2013/0155325 A1 | 6/2013 | Ramamurthy et al. |
| 2016/0005435 A1 | 1/2016 | Campbell et al. |
| 2017/0374411 A1 | 12/2017 | Lederer et al. |
| 2018/0024724 A1 | 1/2018 | Patel et al. |
| 2018/0025752 A1 | 1/2018 | Patel et al. |
| 2018/0098131 A1 | 4/2018 | Zhou |
| 2018/0357794 A1 | 12/2018 | Young et al. |
| 2021/0037287 A1 | 2/2021 | Ha et al. |

FOREIGN PATENT DOCUMENTS

| | | |
|---|---|---|
| CN | 106331645 | 1/2017 |
| CN | 106658212 | 5/2017 |
| CN | 106790996 | 5/2017 |
| CN | 107396086 | 11/2017 |
| CN | 107396077 | 4/2022 |
| JP | 2017208808 A | 11/2017 |
| WO | WO-0169911 A2 | 9/2001 |
| WO | WO-2015197815 A1 | 12/2015 |
| WO | WO-2017175738 A1 | 10/2017 |
| WO | WO-2019199637 A1 | 10/2019 |

OTHER PUBLICATIONS

"U.S. Appl. No. 17/046,121, Notice of Allowability dated Feb. 9, 2022", 2 pgs.

"U.S. Appl. No. 17/046,121, Notice of Allowability dated Mar. 30, 2022", 2 pgs.

"U.S. Appl. No. 17/046,121, Notice of Allowance dated Jan. 20, 2022", 7 pgs.

"U.S. Appl. No. 17/046,121, Response filed Sep. 27, 2021 to Non Final Office Action dated May 27, 2021", 13 pgs.

"European Application Serial No. 21198834.0, Extended European Search Report dated Dec. 8, 2021", 10 pgs.

"Indian Application Serial No. 202027049150, First Examination Report dated Dec. 9, 2021", 6 pgs.

"International Application Serial No. PCT/US2019/026264, International Preliminary Report on Patentability dated Apr. 22, 2020", 6 pgs.

"International Application Serial No. PCT/US2019/026264, International Search Report dated May 16, 2019", 3 pgs.

"International Application Serial No. PCT/US2019/026264, Written Opinion dated May 16, 2019", 6 pgs.

"Japanese Application Serial No. 2021-505181, Notification of Reasons for Refusal dated Jan. 11, 2022", w/ English Translation, 6 pgs.

"Korean Application Serial No. 10-2022-7018643, Notice of Preliminary Rejection dated Aug. 1, 2022", w English translation, 8 pgs.

"Chinese Application Serial No. 201980039551.X, Office Action dated Jul. 11, 2022", W English Translation, 20 pgs.

U.S. Appl. No. 17/046,121, filed Oct. 8, 2020, Digital Media System.

"Korean Application Serial No. 10-2022-7018643, Response filed Nov. 30, 2022 to Notice of Preliminary Rejection dated Aug. 1, 2022", w English translation, 34 pgs.

\* cited by examiner

DIGITAL MEDIA SYSTEM

RELATED APPLICATIONS

This application is a continuation of U.S. patent application Ser. No. 17/046,121 filed Oct. 8, 2020, which is a U.S. National Stage Filing under 35 U.S.C. 371 from International Application No. PCT/US2019/026264, filed on Apr. 8, 2019, and published as WO2019/199637 on Oct. 17, 2019, which claims the priority benefits of U.S. Provisional Patent Application No. 62/656,149, filed Apr. 11, 2018, and U.S. Provisional Patent Application No. 62/743,083, filed Oct. 9, 2018, which applications are incorporated herein by reference in their entirety.

TECHNICAL FIELD

The subject matter disclosed herein generally relates to the technical field of special-purpose machines that process digital media, including software-configured computerized variants of such special-purpose machines and improvements to such variants, and to the technologies by which such special-purpose machines become improved compared to other special-purpose machines that process digital media.

BACKGROUND

A machine may be configured to interact with one or more users by streaming digital media content (e.g., a video file, an audio file, an image, text, or any suitable combination thereof) to one or more devices that correspond to the one or more users. For example, if a user causes his or her device to request the streaming of a particular piece of digital media content (e.g., a video file of a movie, a sports event, or a concert), the machine causes that piece of digital media content to be streamed to that user's device. This may be performed by the machine sending sequential portions (e.g., video frames) of the piece of digital media content to the device via a network, or otherwise causing a data repository to send sequential portions of the piece of digital media content to the device via a network. The machine may also interact with the user by receiving and responding to one or more playback commands (e.g., stop, pause, skip ahead, or skip back) communicated from the user's device while the piece of digital media content is being presented by that device.

BRIEF DESCRIPTION OF THE DRAWINGS

Some embodiments are illustrated by way of example and not limitation in the figures of the accompanying drawings.

DETAILED DESCRIPTION

Example methods (e.g., algorithms) facilitate provision or other processing of digital media (e.g., video, audio, images, text, or any suitable combination thereof), and example systems (e.g., special-purpose machines configured by special-purpose software) are configured to facilitate provision or other processing of digital media. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A digital media system is configured to support any one or more of multiple features with respect to virtual-reality content. Examples of such features include directional picture-in-picture (PIP) windows based on viewing direction, directional audio based on viewing direction, user recommendations based on anomalous viewing times of certain visual features in video content, dynamic adjustment of time-to-live (TTL) durations prior to requesting deletion of video files uploaded to a content distribution network, dynamic adjustment of durations of video files to upload based on network capacity, dynamic adjustment of quantities of video files per set to upload based on network capacity, dynamic resizing of top-depicting or bottom-depicting regions within the picture areas of sets of video files, dynamic resizing of the picture areas themselves within sets of video files, or any suitable combination thereof.

Digital Media System

Figure 1:
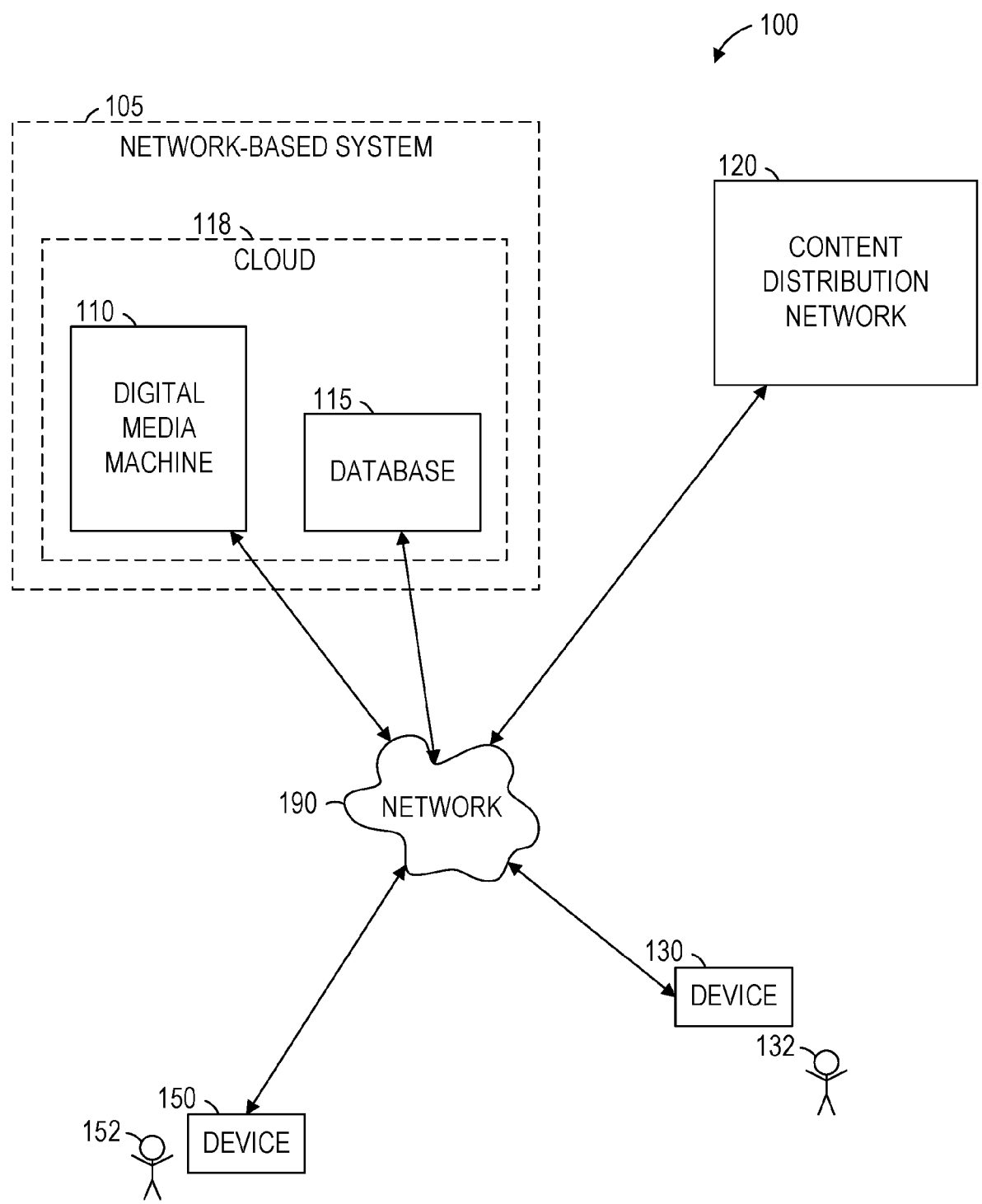
FIG. 1 is a network diagram illustrating a network environment suitable for provision of digital media or other processing of digital media, according to some example embodiments.

FIG. 1 is a network diagram illustrating a network environment 100 suitable for provision of the processing digital media, according to some example embodiments. The network environment 100 includes a digital media machine 110, a database 115, a content distribution network 120, and devices 130 and 150, all communicatively coupled to each other via a network 190. The digital media machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). In some example embodiments, the content distribution network 120 is part of the cloud 118, while in other example embodiments, the content distribution network 120 forms all or part of a third-party cloud distinct from the cloud 118 (e.g., within a third-party network-based system distinct from the network-based system 105). The digital media machine 110, the database 115, the content distribution network 120, and the devices 130 and 150 may each be implemented in one or more special-purpose (e.g., specialized) computer systems, in whole or in part, as described below with respect to FIG. 12.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130 (e.g., a client device configured to present digital media, including virtual-reality content). For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150 (e.g., a client device configured to present digital media, including virtual-reality content). As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 12, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The digital media machine 110 provides data streaming services and manages streaming of virtual-reality content. The digital media machine 110 may find useful applications in entertainment (e.g., sports, concerts, or documentaries), education (e.g., academic, corporate, or professional training), industry (e.g., tourism or medicine), or any suitable combination thereof, including live or otherwise low-latency applications (e.g., news reporting or gaming). The digital media machine 110 may accordingly provide one or more data streams of virtual-reality content itself, cause one or more of such data streams to be provided by the content distribution network 120, or any suitable combination thereof. The virtual-reality content may be provided to one or more client devices, such as one or more of the devices 130 and 150 (e.g., a virtual-reality headset, a mobile device, or other device capable of displaying virtual-reality content).

Figure 2:
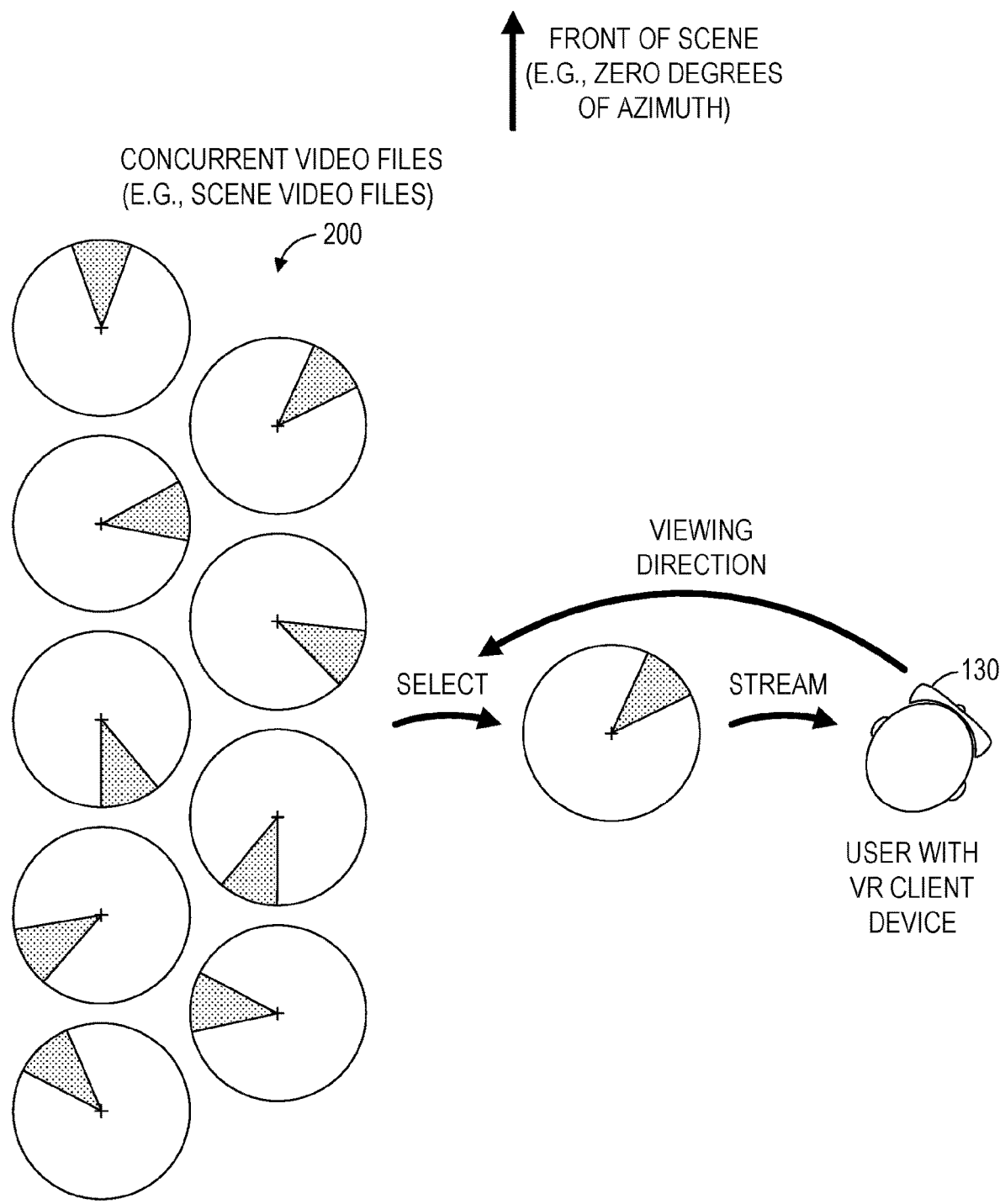
FIG. 2 is a diagram illustrating representation of an immersive scene by a set of concurrent video files, according to some example embodiments.

Referring to FIG. 2, virtual-reality content may take the form of an immersive "scene" that is represented by, for example, 9-12 concurrent video files 200 that all depict at least a common time span of the scene (e.g., all depicting the same 2 seconds of content, all depicting the same 6 seconds of content, or all depicting the same 12 seconds of content). This set of 9-12 concurrent video files 200 is made available (e.g., by the digital media machine 110, the database 115, the content distribution network 120, or any suitable combination thereof) to be streamed individually to one or more client devices (e.g., the client device 130). Each individual video file includes a sequence of timestamped two-dimensional spherical images, each spherical image depicts the full scene (e.g., showing a full 360 degrees of azimuth around the position of the viewer). These spherical images function as sequential video frames within their corresponding video file. Moreover, each individual video file and its constituent spherical images may depict, specify, define, represent, or otherwise have a picture area with a "foveated" region that has sharper detail and higher resolution than the "non-foveated" remainder of the picture area. For example, a foveated region may be a central region that has "6K" resolution (e.g., at or near 6144×3072 pixels), while its neighboring non-foveated regions may have "4K" resolution (e.g., at or near 3840×2160 pixels).

Furthermore, within the set of 9-12 concurrent video files 200 for a particular scene, each individual video file may have a different foveated region that is aligned with a different corresponding angle of azimuth relative to the viewer's position. For example, the set of 9 concurrent video files 200 for a given scene may all differ from each other by centering their respective foveated regions at different viewing directions denoted by 40 degree increments around the viewer's position (e.g., at 0, 40, 80, 120, 160, 200, 240, 280, 320 degrees respectively, relative to the front or forward direction of the scene).

In many situations, the most interesting portions of the virtual-reality content to a user (e.g., the user 132) appear within a range of moderately positive to moderately negative angles of elevation relative to the viewer's position within the scene, and relatively uninteresting portions of the virtual-reality content appear beyond that range at highly positive or highly negative angles of elevation. Accordingly, the foveated region of the picture area in any given video file may be vertically confined to the range of moderately positive to moderately negative elevation angles, or to the subset of that range. Regions of the picture area above or below that range may be treated as non-foveated regions or may be down-sampled to an even lower resolution for data efficiency.

Moreover, regions of the picture area that have highly positive or highly negative elevation angles may be termed considered as "top" or "bottom" regions, respectively, and such top and bottom regions of the picture area may be treated similarly to other non-foveated portions of the picture area or even have lower resolution (e.g., using "2K" resolution at or near 2048×1080 pixels) than the other non-foveated portions (e.g., using "4K" resolution at or near 3840×2160 pixels) of the picture area. In addition, for efficiency in data compression, the top and bottom regions may be grouped together and moved to one of the margins (e.g., top margin, bottom margin, left margin, or right margin) of the spherical images of a given video file among the set of concurrent video files, but nonetheless rendered as properly positioned top and bottom regions of the picture area by one or more client devices (e.g., the device 130).

Accordingly, to enable a user (e.g., the user 132) to view the scene in any arbitrary direction, a client device (e.g., the device 130, which may be or include a virtual-reality headset) is configured to automatically and repeatedly determine the user's direction of view (e.g., based on motion detection sensors) and request (e.g., from the digital media machine 110) provision of the individual video file that has its corresponding foveated region most closely aligned with the direction of view. This may be performed by repeatedly sending the viewing direction (e.g., azimuth and elevation, or azimuth only) to the digital media machine 110, and the digital media machine 110 may repeatedly and dynamically respond by providing, or otherwise causing the client device to receive (e.g., from a content distribution network), the video file that is most closely aligned with the viewing direction. Since the concurrent video files 200 for the scene all have timestamped spherical images as video frames, the client device is configured to seamlessly switch from displaying one obtained video file to displaying another obtained video file, as the requests for such video files are fulfilled and the video files arrive.

As a result, the user (e.g., the user 132) can view the scene in any arbitrary direction and can arbitrarily change the direction of view, and the user sees foveated virtual-reality content substantially in front of the user at all times or almost all of the time, even as the user arbitrarily and rapidly changes the direction in which the scene is being viewed. Various example embodiments of the digital media machine 110 have one or more of the features discussed below, each of which may be implemented with or without any one or more of the other features discussed below, with or without any one or more of the features discussed above, or any suitable combination of, unless otherwise specified.

Directional Picture-In-Picture (PIP)

Figure 3:
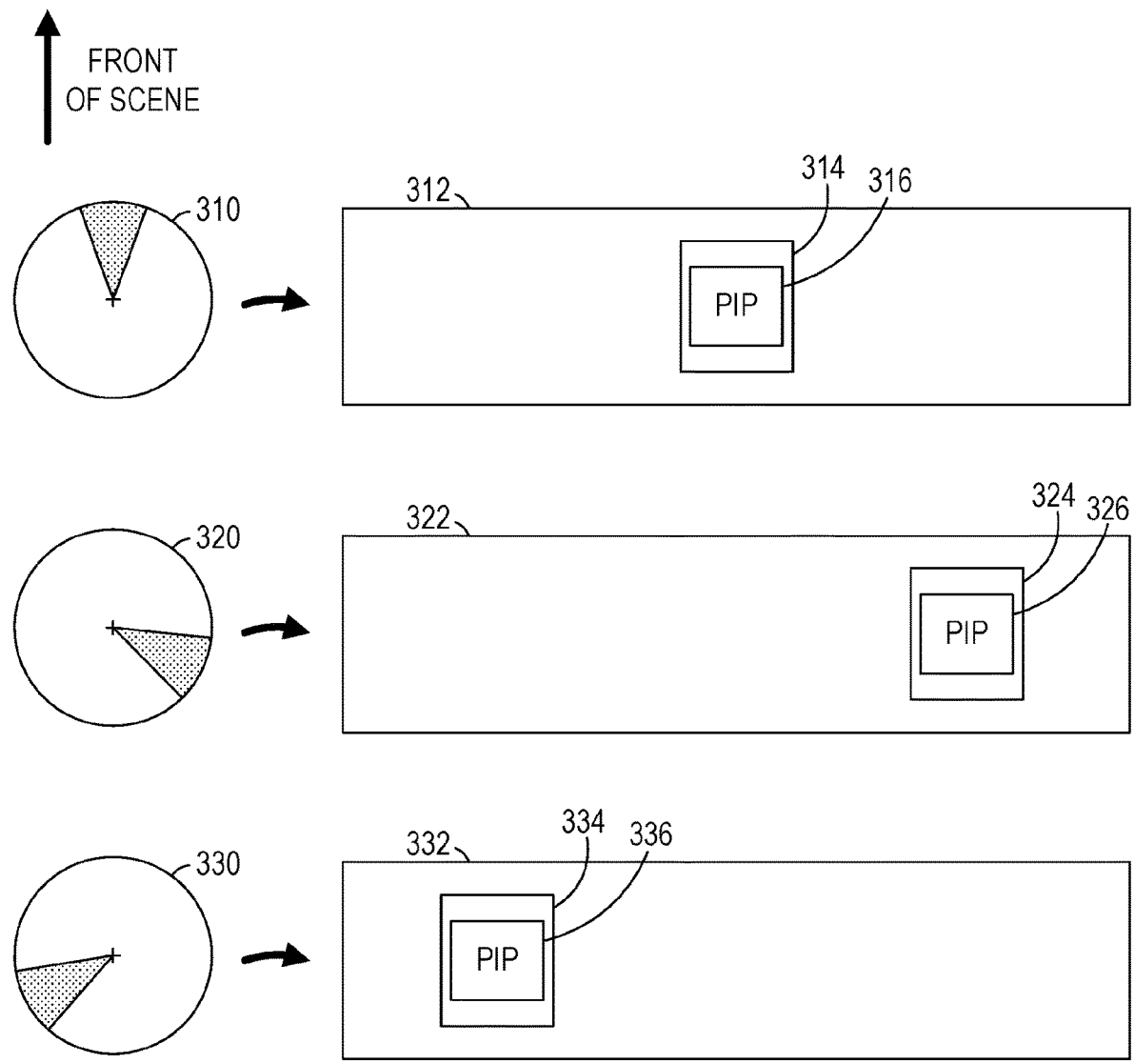
FIG. 3 is a diagram illustrating directional picture-in-picture (PIP) windows, according to some example embodiments.

Referring to FIG. 3, in some example embodiments, the digital media machine 110 is configured to support PIP, which may include supporting multiple instances of PIP (e.g., multiple PIP windows occurring within a single scene). Moreover, such multiple instances of PIP may each be displayed in a different video file among the set of concurrent video files (e.g., concurrent video files 200) representing a given scene. In this context, it is helpful to call the concurrent video files "scene video files."

Accordingly, the digital media machine 110 may access (e.g., receive, retrieve, obtain, or read) one or more supplemental video files to be inserted as one or more PIP windows 316, 326, and 336 into one or more of the scene video files. The accessing may be performed via download, via streaming video, or via any suitable combination thereof (e.g., from the content distribution network 120 or from a video server).

The digital media machine 110 may then modify one or more of the scene video files to depict one or more of the accessed supplemental video files somewhere in the picture area (e.g., somewhere in the foveated region of the picture area). Each supplemental video file may be displayed its own corresponding PIP window within its corresponding scene video file, which may occupy some or all of the foveated region in that scene video file. The one or more modified scene video files may then be incorporated into the full set of scene video files and provided to one or more client devices as described above.

Accordingly, the digital media machine 110 can insert a different PIP window with PIP content from a different supplemental video file into each of the scene video files or in the subset thereof. Thus, any one or more PIP windows has a directional dependency within the scene. That is, a PIP window may appear only in a subset of the scene video files and therefore appear only in the subset of the available viewing directions. Alternatively, a PIP window may appear in all scene video files and therefore appear in all available viewing directions, but only appear in sharp detail with high resolution in the corresponding foveated region of one or two scene video files and appear in fuzzy detail with low resolution in the corresponding non-foveated regions of the other scene video files.

For example, a scene can be augmented to display one minimally intrusive PIP window directly behind the viewer's position, and this PIP window may suddenly appear only when the user turns to directly view 180 degrees of azimuth behind the front or forward direction of the scene. This may be performed by placing the PIP window in only one of the scene video files, namely, the particular scene video file whose foveated region is centered directly opposite the front or forward direction. This may be useful, for example, in providing an on-demand graphical user interface (e.g., for help files, messaging, or other interaction) within the PIP window while the user is viewing an otherwise fully immersive scene.

Alternatively, if there are two scene video files having their foveated regions (e.g., at 160 degrees and 200 degrees, respectively) most closely aligned with 180 degrees behind the front or forward orientation of the scene, both foveated regions may be augmented by insertion of the PIP window (e.g., one towards the left side of the foveated region centered at 160 degrees, and one towards the right side of the foveated region centered at 200 degrees, such that the PIP window does not appear to move in space when the client device switches between the two scene video files).

As another example, different PIP windows can be shown in different directions relative to the front or forward direction of the scene. In a multiplayer gaming scenario, the same scene can be shown to multiple players and multiple spectators who each operate his or her own individual client device. The digital media machine 110 assigns each player (e.g., up to the number of scene video files) to a different scene video file and inserts a corresponding PIP window for that player into the foveated region of his or her assigned scene video file. The inserted PIP window displays in-game graphics and feedback for that player. Thus, the player must view the scene in his or her assigned direction to effectively play the game, while any spectator may view the game from the perspective of any player by changing his or her viewing direction within the scene.

In a variant of the multiplayer gaming scenario, the same scene can be shown to, for example, three players assigned to scene video files corresponding to 0, 120, and 240 degrees respectively, relative to the front or forward direction of the scene, and their respective PIP windows can be inserted into all of the scene video files (e.g., all 9 of 9 scene video files). However, the PIP window for the player assigned to one direction (e.g., 0 degrees) only appears in sharp detail within the foveated region of the scene video file for that direction; all other scene video files also depict that player's PIP window but only in non-foveated regions with lower resolution. Thus, the player assigned to that direction must view the scene in the assigned direction to effectively play the game, while any spectator may view any player's PIP window by changing his or her viewing direction. This variant may be less visually jarring to view, since each player's PIP window can appear to remain in place (e.g., hovering in space) without suddenly appearing or disappearing with changes in viewing direction.

FIG. 3 illustrates one variant of this example by depicting three scene video files 310, 320, and 330 (e.g., among a full set of scene video files, such as the concurrent video files 200) have been modified to respectively include the PIP windows 316, 326, and 336 within their respective foveated regions 314, 324, and 334 of their corresponding picture areas 312, 322, and 332. One or more of the remaining scene video files for the scene may depict one or more of the PIP windows 316, 326, and 336 in non-foveated regions of their respective picture areas. In the illustrated variant, the PIP window 316 is only visible when the scene is viewed in its front direction; the PIP window 326 is only visible when the scene is viewed in its corresponding direction (e.g., 120 degrees from front); and the PIP window 336 is only visible when the scene is viewed and its corresponding direction (e.g., 240 degrees from front).

Directional Audio

In certain example embodiments, the digital media machine 110 is configured to support directional audio, with or without a directional PIP window. For example, in addition to supporting directional PIP, the digital media machine 110 may insert or amplify the audio that corresponds to each PIP window within the scene video file containing that PIP window. Accordingly, in a multiplayer gaming scenario, a player assigned to a given direction of view must view the scene in that assigned direction to effectively hear the audio for his or her PIP window. In some example embodiments, the audio for his or her PIP window is present only in the single scene video file that contains his or her PIP window. In other example embodiments, the audio is present in all scene video files but at low volume levels (e.g., unusably low for game play purposes) in all scene video files except the assigned scene video file, in which the audio is clear and has normal (e.g., full) volume.

Figure 4:
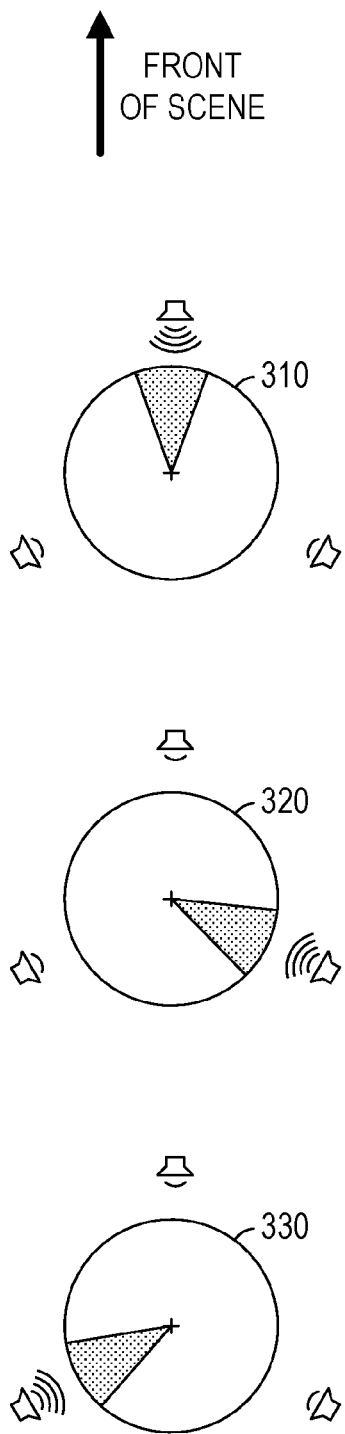
FIG. 4 is a diagram illustrating directional audio, according to some example embodiments.

Some of these latter example embodiments are illustrated in FIG. 4, which depicts the previously discussed three scene video files 310, 320, and 330 (e.g., among a full set of scene video files, such as the concurrent video files 200), and each of the three scene video files 310, 320, and 330 has its own corresponding mix (e.g., multichannel balance) of audio. As shown in FIG. 4, the scene video file 310 may have its foveated region (e.g., the foveated region 314 in FIG. 3) oriented towards (e.g., centered on) 0 degrees relative to the front or forward direction of the scene, and the corresponding audio track from 0 degrees relative to the front or forward direction of the scene is amplified to full volume in the audio mix, while audio tracks from other viewing directions (e.g., 120 and 240 degrees from front) are relatively attenuated (e.g., with reduced audio gain) in the audio mix. As noted above, the audio tracks from other viewing directions may be muted or entirely absent from the audio mix, according to other example embodiments.

In addition, the digital media machine 110 may be configured to support another form of directional audio by causing one or more client devices to adjust audio equalization and thus spatialize the audio for the user in accordance with changes in the direction in which the scene is viewed. Multi-sensor cameras are often used to capture virtual-reality content, and as used herein, a multi-sensor camera is a device or integrated set of devices capable of capturing and digitizing light in a 360 degree horizontal field of view (e.g., azimuth) around itself, with or without capturing a full 180 degree vertical field of view (e.g., elevation) relative to itself. Some multi-sensor cameras have multiple video sensors aimed in different directions and include a separate microphone near each video sensor (e.g., with the microphone pointing the same direction as the video sensor). In some cases, the microphones are omnidirectional. The digital media machine 110 may be configured to isolate any one or more of the audio signals from such microphones and provide one or more client devices with frequency information (e.g., audio equalization settings) usable to perform client-side audio spatialization.

This may be performed by sampling the audio data from each microphone (e.g., during a given video frame within a scene video file being captured by a video sensor that corresponds that microphone) and performing a transform (e.g., a Fast Fourier transform) thereof to the frequency domain. By comparing these frequency analyses for audio data from multiple microphones, the digital media machine determines which microphone, which corresponding video sensor, and which corresponding viewing direction are most closely pointing at a particular sound (e.g., a speaking voice or a mechanical hum) among multiple sounds present. Accordingly, the digital media machine 110 may generate a set of audio equalization settings that amplify or otherwise emphasize that particular sound over other sounds and send those audio equalization settings to one or more client devices, such that the client devices can amplify or otherwise emphasize that sound without receiving more sophisticated audio spatialization data (e.g., multiple channels of audio).

User Recommendations

In some example embodiments, the digital media machine 110 or some other machine within the network-based system 105 is configured to generate and provide user recommendations (e.g., to the user 132 via the device 130). Such a machine may be configured to implement machine learning and artificial intelligence, for example, by training a neural network to learn the preferences of a user (e.g., the user 132) in favoring or disfavoring various imagery presented to the user in various immersive scenes, with or without PIP windows. One example method 500 for providing such a user recommendation is illustrated in FIG. 5.

Figure 5:
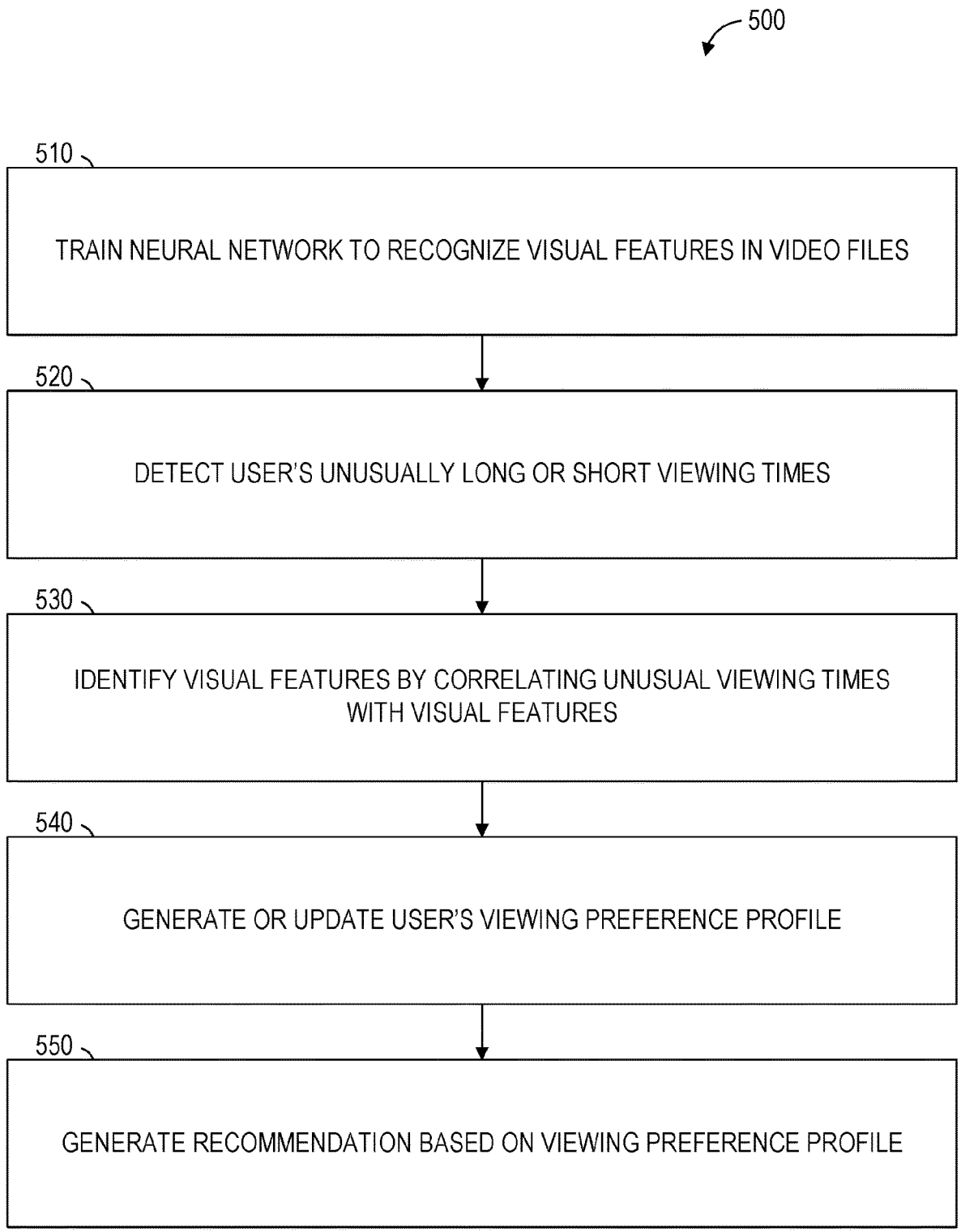
FIG. 5 is a flowchart illustrating operations of a method for providing a user recommendation, according to some example embodiments.

FIG. 5 is a flowchart illustrating operations of the digital media machine 110 or other suitably configured machine in performing the method 500 of providing a recommendation, according to some example embodiments. Operations in the method 500 may be performed using one or more processors (e.g., microprocessors or other hardware processors). As shown in FIG. 5, the method 500 includes operations 510, 520, 530, 540, and 550.

As illustrated by operations 510, 520, and 530, the digital media machine 110 may train a neural network to identify which visual features that appear in one or more scene video files, one or more supplemental video files shown in one or more PIP windows, or any suitable combination thereof, are correlated with longer or shorter viewing times when viewed by the user.

For example, in operation 510, the digital media machine 110 trains a neural network (e.g., convolutional neural network or other suitable new network) to recognize, identify, or otherwise be able to detect various visual features that appear in various video files (e.g., scene video files, supplemental video files, or both). In operation 520, the digital media machine 110 detects anomalous or otherwise significantly long or short viewing times of a user (e.g., the user 132), as indicated by how long the user maintained his or her gaze at various video files (e.g., within foveated regions of scene video files that correspond to various viewing directions, or toward supplemental video files shown in PIP windows that correspond to various viewing directions). In some situations, the digital media machine 110 generates a histogram or other statistical distribution of viewing times and compares the viewing times to one or more threshold ranges that indicate unusually longer or unusually shorter viewing times for that user.

In operation 530, the digital media machine 110 identifies the visual features that were shown in the video files (e.g., within their foveated regions) that were viewed for unusually short or unusually long times by the user (e.g., the user 132), and the digital media machine 110 may do this by correlating the anomalous viewing times with their associated video files (e.g., scene video files, supplemental video files, or both) and then inputting these video files into the trained neural network, such that the trained neural network recognizes the visual features shown in those video files.

This mapping of visual features to viewing times can then be used as all or part of a viewing preference profile of the user, and FIG. 5 illustrates this in operation 540. Thus, the digital media machine 110 can generate or update (e.g., within the digital machine 110 or the database 115) one or more data records that correlate the user's unusual viewing times with corresponding visual features, and these one or more data records may form all or part of that user's viewing preference profile.

In operation 550, the digital media machine 110 accordingly generates or otherwise makes one or more recommendations of imagery (e.g., one or more immersive scenes, one or more supplemental video files, or any suitable combination thereof) to suggest to the user (e.g., the user 132), recommend to the user, present to the user, advertise to the user, or otherwise bring to the user's attention.

For example, the viewing preference profile of the user may indicate that the user enjoys long periods of gazing at peaceful landscapes, and the machine may accordingly recommend (e.g., by generating and providing a recommendation message) one or more additional landscapes with visual features that are also present in peaceful landscapes for the user to view. As another example, the viewing preference profile may indicate that the user is averse to imagery that depicts spiders, because the user quickly averts his or her gaze from such imagery, and the machine may accordingly avoid presenting any imagery with visual features that are also present in arachnid imagery to the user, or at least generating and presenting a warning message to the user prior to presenting imagery with such visual features to the user.

The digital media machine 110 may also analyze a viewing preference profile of one user and determine a likelihood that the viewing preference profile actually combines the viewing preferences of multiple users. When a single user account has a viewing preference profile that, within a threshold level of similarity, mathematically resembles a combination (e.g., summation, concatenation, or aggregation) of two or more viewing preference profiles (e.g., as determined by clustering the viewing preference profiles of many users), the digital media machine 110 and may determine that multiple users (e.g., users 132 and 152) are sharing the same user account (e.g., using the same user account to view their respectively preferred imagery at different times).

In addition to training a neural network based on visual features that appear in various imagery (e.g., immersive scenes, supplemental video files, or any suitable combination thereof), the training of the neural network may be based on the user's preferences for viewing angle (e.g., which viewing directions are favored or disfavored), preferences for whether a PIP window is present in a foveated region, preferences for where a PIP window is located within a foveated region, preferences for content of the PIP window (e.g., particular supplemental video files, their genre, their authors, and the like).

Some variants of the digital media machine 110 may also modify imagery based on the viewing preference profile of the user, for example, by adding a visual highlight at, around, or near portions of imagery selected based on the viewing preference profile. For example, if the viewing preference profile of the user indicates that the user enjoys looking at furry animals, the machine may modify one or more scene video files by drawing a bright yellow circle around portions of the scene video files that depict one or more furry animals. This may be performed inside or outside the foveated region of each respective scene video file. Thus, as the user changes viewing direction within an immersive scene, one or more portions of the scene may be highlighted to attract the user's attention to those one or more portions.

In some variants, the digital media machine 110 additionally supports interactive selection of a highlighted portion by the user, such that the user (e.g., the user 132) is enabled to his or her selection of a highlighted portion (e.g., via the device 130), and the machine is configured to respond to that selection by providing further information that corresponds to the selection. For example, if the user selects a bright yellow circle around a depiction of a furry animal (e.g., a dog, a cat, or a ferret), the machine may respond by presenting a PIP window in the user's currently viewed foveated region, and the PIP window may contain a description of the furry animal, an invitation to purchase the furry animal, or both.

Dynamic Length of Uploaded Files Based on Network Capacity

In certain example embodiments, the digital media machine 110 manages the streaming of an immersive scene to one or more client devices (e.g., the devices 130 and 150) and may respond to changes in view direction at each individual device (e.g., the device 130) by causing that device to receive the scene video file for that view direction from among the set of scene video files for the immersive scene. As noted above, the digital media machine 110 may upload the set of scene video files to the content distribution network 120 to facilitate distribution of various individual scene video files, while still responding to requests from client devices by controlling which individual client device (e.g., the device 130) receives which individual scene video file from the content distribution network 120. In some example embodiments, the digital media machine 110 stores the set of scene video files in the database 115, from which the set of scene video files can be uploaded to the content distribution network 120 (e.g., for subsequent distribution to one or more client devices) or provided to one or more client devices directly (e.g., via the network 190).

In general, the total duration of the immersive scene may be several minutes, multiple hours, or even indefinite (e.g., a live on-going event). Thus, to facilitate low-latency provision of the immersive scene to the one or more client devices (e.g., the device 130), different sets of scene video files may temporally subdivide the immersive scene into different segments whose respective durations are in the range of 2-6 seconds each (e.g., with file sizes of individual scene video files ranging from 0.2 megabytes to 0.7 megabytes each). For example, a one-hour immersive scene may be subdivided into 600 sequential segments that are each 6 seconds long in duration, each of these six-second segments may be represented by a different corresponding set of 9-12 scene video files. Each scene video file in a given set of scene video files for a given segment may span the duration of that segment.

Moreover, the digital media machine 110 may dynamically adjust the duration of the scene video files, or sets thereof, and thus dynamically adjust the duration of the sequential segments of the immersive scene. This may be done based on (e.g., in response to) the detected network capacity (e.g., upload data rate or upload bandwidth) between the digital media machine 110 and the content distribution network 120. For example, the digital media machine 110 may switch to uploading scene video files of dynamically adjusted shorter durations (e.g., 2-4 seconds each) in response to detecting that the network 190 is experiencing congestion (e.g., congestion worse than a threshold level, which may be represented by a measured upload data rate falling below a minimum upload data rate), and later switch back to uploading scene video files of dynamically adjusted longer durations (e.g., 4-6 seconds each) in response to detecting that the network 190 is no longer experiencing the previously detected congestion (e.g., congestion better than the threshold level, which may be represented by a measured upload data rate meeting or exceeding the minimum upload data rate).

As a result, when the network 190 is heavily congested and the upload data rate is accordingly low, the digital media machine 110 uploads smaller scene video files (e.g., 0.2-0.4 megabytes) of shorter duration (e.g., 2-4 seconds), which typically would take longer to upload in such congested conditions; and when the network 190 is not congested or only lightly congested, and the upload data rate is accordingly high, the digital media machine 110 uploads larger scene video files (e.g., 0.4-0.7 megabytes) of longer duration (e.g., 4-6 seconds), which typically can be uploaded quickly under such network conditions. For clarity and brevity, the present discussion focuses on network congestion between the digital media machine 110 and the content distribution network 120, but in example embodiments where scene video files are uploaded from the digital media machine 110 to the database 115, similar operations are applicable for network congestion between the digital media machine 110 and the database 115.

Figure 6:
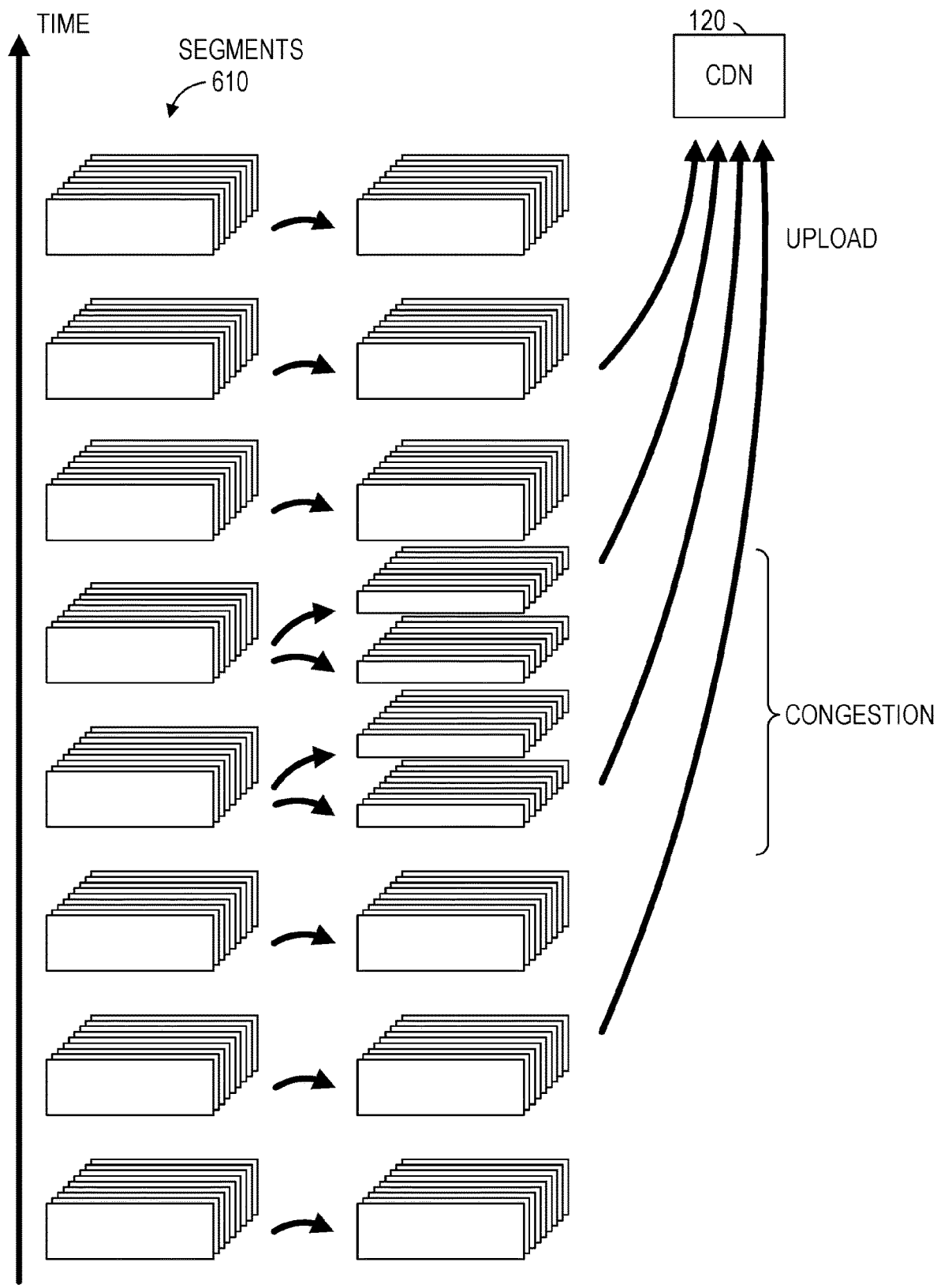
FIG. 6 is a diagram illustrating dynamic adjustment of lengths of video files to upload based on network capacity, according to some example embodiments.

FIG. 6 is a diagram illustrating how the digital media machine 110 dynamically adjusts lengths of video files to upload based on network capacity, according to some example embodiments. As shown in FIG. 6, an immersive scene is subdivided into at least 8 segments 610, which may be segments of default duration (e.g., 6 seconds long) and default file size (e.g., 0.7 megabytes). These segments 610 may be stored by the digital media machine 110, the database 115, or any suitable combination thereof, prior to being uploaded to the content distribution network 120.

In the scenario depicted by FIG. 6, there is no network congestion (e.g., within the network 190) detected by the digital media machine 110 when the first three of the segments 610 are uploaded to the content distribution network 120. Accordingly, the first three of the segments 610 are uploaded without alteration (e.g., without being subdivided into sub-segments of shorter duration).

However, in the scenario depicted by FIG. 6, prior to uploading the fourth of the segments 610, the digital media machine 110 detects that network congestion has reduced the upload data rate beyond a threshold level. In response, the digital media machine 110 subdivides the fourth and fifth segments among the segments 610 into sub-segments of non-default duration (e.g., 3 seconds long) and non-default file size (e.g., 0.35 megabytes), and the digital media machine 110 uploads the resulting sub-segments to the content distribution network 120, while the upload data rate is below the threshold level.

Continuing with the scenario depicted by FIG. 6, the network congestion becomes alleviated and no longer detectable by the digital media machine 110 during the uploading of the sub-segments (e.g., during the uploading of the last sub-segment of the fifth segment among the segments 610). For example, the digital media machine 110 may detect that the upload data rate has risen above a threshold level (e.g., the previously used threshold level or an alternative threshold level for detecting an absence of network congestion). In response, the digital media machine 110 ceases the subdividing of the segments 610 of the immersive scene and resumes normal uploading. As a result, the sixth, seventh, and eighth segments among the segments 610 have their default durations (e.g., 6 seconds long) and default file sizes (e.g., 0.7 megabytes), like the first, second, and third segments among the segments 610 of the immersive scene.

Dynamic Number of Files to Upload Based on Network Capacity

In various example embodiments, the digital media machine 110 dynamically adjusts the size of each set of scene video files by dynamically adjusting the number of scene video files to be uploaded as part of each set. That is, the quantity of scene video files included in a given set can be dynamically adjusted in response to changes in upload data rate. This is another way that the digital media machine 110 can respond to fluctuations in network capacity (e.g., within the network 190) between the digital media machine 110 and the content distribution network 120.

For example, the digital media machine 110 may switch to uploading fewer scene video files in each set of scene video files (e.g., 1-5 files per set) in response to detecting that the network 190s experiencing congestion (e.g., congestion worse the threshold level, which may be represented by a measured upload data rate falling below a minimum upload data rate), and later switch back to uploading more scene video files in each set of scene video files (e.g., a full set of 9-12 files) in response to detecting that the network 190 is no longer experiencing the previously detected congestion (e.g., congestion better than the threshold level, which may be represented by a measured upload data rate meeting or exceeding the minimum upload data rate).

As a result, when the network 190 is heavily congested and the upload data rate is accordingly low, the digital media machine 110 uploads fewer scene video files per set (e.g., 3 files per set), such that the uploading of each of these smaller sets is likely to be completed in such congested congestions prior to any of their scene video files becoming requested for streaming. Conversely, when the network 190 is not congested or only lightly congested, and the upload data rate is accordingly high, the digital media machine 110 uploads more scene video files (e.g., 9 files per set, or 12 files per set), such that the uploading of each of these larger sets is likely to be completed prior to any of their scene video files becoming requested for streaming. For clarity and brevity, the present discussion focuses on network congestion between the digital media machine 110 and the content distribution network 120, but in example embodiments where scene video files are uploaded from the digital media machine 110 to the database 115, similar operations are applicable for network congestion between the digital media machine 110 and the database 115.

Figure 7:
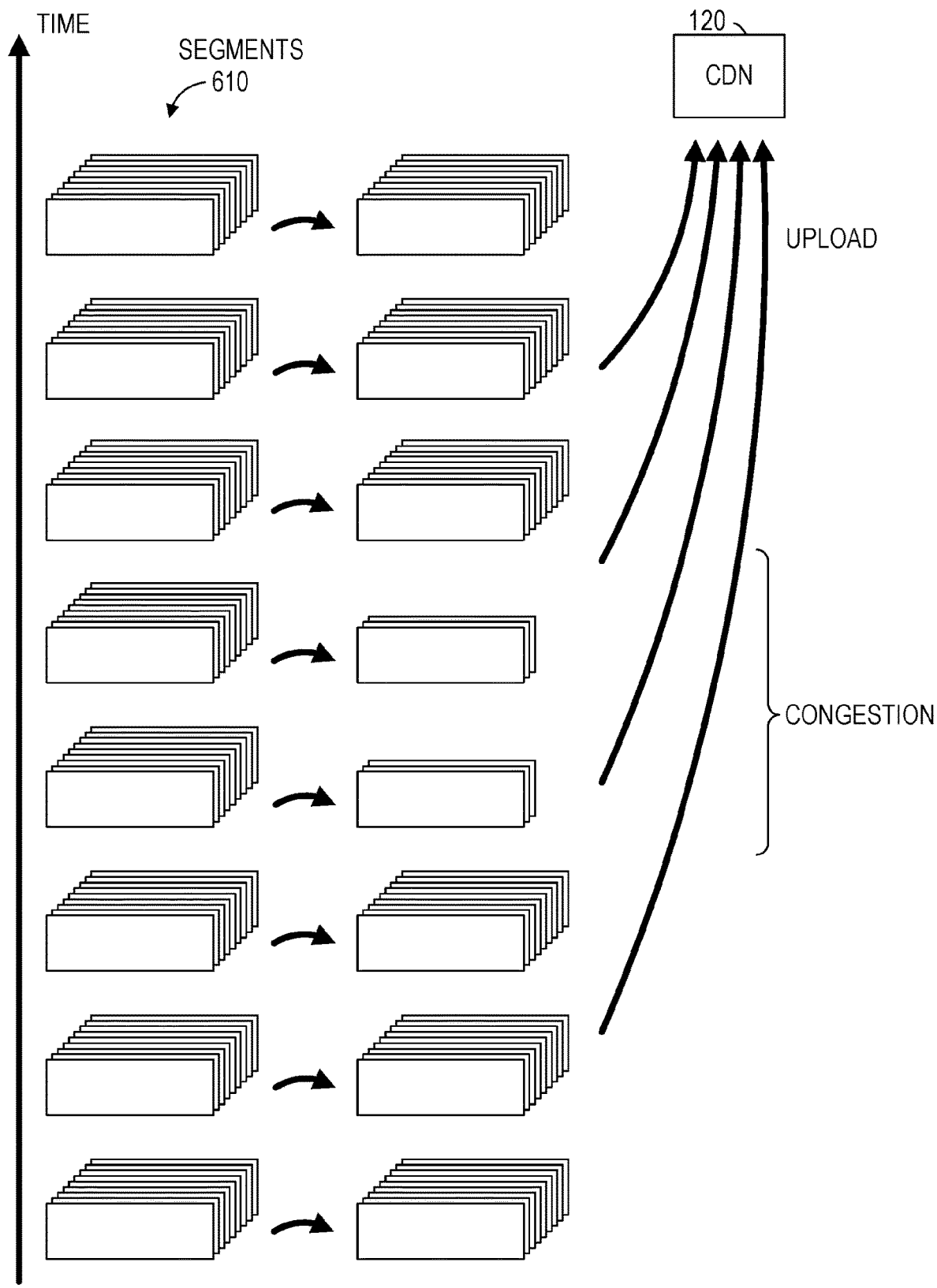
FIG. 7 is a diagram illustrating dynamic adjustment of numbers of video files per set to upload based on network capacity, according to some example embodiments.

FIG. 7 is a diagram illustrating how the digital media machine 110 dynamically adjusts numbers of video files per set to upload based on network capacity, according to some example embodiments. As shown in FIG. 7, the immersive scene previously discussed with respect to FIG. 6 is subdivided into at least 8 segments 610. As noted above, these segments 610 may all have a default duration (e.g., 6 seconds long), and a default file size (e.g., 0.7 megabytes), and the segments 610 may be stored by the digital media machine 110, the database 115, or any suitable combination thereof, in preparation to being uploaded to the content distribution network 120.

In the scenario depicted by FIG. 7, there is no network congestion (e.g., within the network 190) detected by the digital media machine 110 when the first, second, and third segments among the segments 610 are uploaded to the content distribution network 120. Accordingly, the first, second, and third segments among the segments 610 are uploaded as full-size sets of scene video files (e.g., 9 files per set, or 12 files per set).

However, in the scenario depicted by FIG. 7, prior to uploading the fourth segment among the segments 610, the digital media machine 110 detects that network congestion has reduced the upload data rate beyond a threshold level. In response, the digital media machine 110 reduces the number of scene video files to be uploaded in each of the fourth and fifth segments among the segments 610 (e.g., down to 1 file per set, or 3 files percent), and the digital media machine 110 that uploads the resulting reduced sets of scene video files while the upload data rate is below the threshold level.

During this period of where the network congestion is detected by the digital media machine 110, a user (e.g., the user 132) who selects a viewing direction for which the corresponding scene video file has not been uploaded will be presented with only non-foveated content from a non-foveated region of one of the scene video files that have been uploaded to the content distribution network 120. However, the situation may be deemed by the user to be more desirable than viewing no content at all (e.g., as a result of pausing the presentation of content until the scene video file with the foveated content that corresponds to the selected viewing direction has been uploaded and becomes available for streaming.

Moreover, during this period, the digital media machine 110 may prioritize the inclusion of one or more scene video files in each set for each segment among the segments 610 of the immersive scene. Priority can be given to one or more selected scene video files that correspond to one or more special viewing directions (e.g., top priority for a zero degree (front) camera feed or a viewing direction whose foveated content depicts the main action in the immersive scene). In addition, a prioritized viewing direction which may shift with certain content. For example, in horseracing, the viewing direction with the scene video file whose foveated region depicts the lead horse in a race may change as the horse passes in front of the viewing position. Accordingly, during this period of network congestion, the digital media machine 110 may dynamically adjust which viewing directions are represented by the reduced number of scene video files included in each set for each segment among the segments 610 of the immersive scene.

Continuing with the scenario depicted by FIG. in 7, the network congestion becomes alleviated and no longer detectable by the digital media machine 110 during the uploading of the reduced sets of scene video files (e.g., during the uploading of the reduced set of scene video files for the fifth segment among the segments 610). For example, the digital media machine 110 may detect that the upload data rate has risen above a threshold level (e.g., the previously used threshold level or an alternative threshold level for detecting an absence of network congestion). In response, the digital media machine 110 ceases the reducing of the number of scene video files per set and resumes normal uploading. As a result, the sixth through eighth segments among the segments 610 are uploaded as full-size sets of scene video files (e.g., 9 files per set, or 12 files percent), like the first, second, and third segments among the segments 610 of the immersive scene.

Dynamic Deletion of Uploaded Video Segments

In some example embodiments, the digital media machine 110 performs dynamic management and control of the content distribution network 120, which may have the effect of optimizing or otherwise improving the usage of the content distribution network 120 by the digital media machine 110. For this purpose, the digital media machine 110 may delete previously uploaded segments of an immersive scene (e.g., uploaded scene video files) that are older than a dynamically adjustable threshold time since being uploaded to the content distribution network 120.

In situations where uploaded scene video files quickly become obsolete (e.g., non-live or otherwise unlikely to be requested by client devices) after being uploaded, the digital media machine 110 may adjust an internally stored time-to-live (TTL) value and cause uploaded scene video files to be deleted from the content distribution network 120 after expiration of a time span equal to or otherwise defined based on the TTL value. For example, if the digital media machine 110 has uploaded a six-second segment of the immersive scene to the content distribution network 120, the digital media machine 110 may set the TTL value to five seconds, and request deletion of all scene video files uploaded longer than five seconds ago. This process may be repeated for each segment of the immersive scene.

Thus, the digital media machine 110 can manage the content distribution network 120 such that the content distribution network 120 only stores scene video files with a significant likelihood of being requested by a client device (e.g., the client device 130). This may provide cost savings in situations where the content distribution network 120 is managed by a third-party that charges fees for the hosting of files by the content distribution network 120.

Moreover, the digital media machine 110 can dynamically adjust the TTL value based on the dynamically adjusted length of the scene video files, which is discussed above. For example, the TTL may be increased during periods of network congestion (e.g., in conjunction with the uploading of scene video files of shorter duration), since it may be preferable to provide a recently obsoleted scene video file (e.g., for a short duration) if its replacement subsequent scene video file is not yet fully uploaded due to the network congestion. As another example, the TTL may be decreased when the network congestion is no longer present (e.g., in conjunction with the uploading of scene video files of longer duration), to optimize the usage of storage capacity at the content distribution network 120. Accordingly, these two features operate together to efficiently manage network resources (e.g., the network 190 and the content distribution network 120) as network capacity may fluctuate.

Furthermore, the digital media machine 110 may be configured to omit or implement (e.g., suspend or resume) such dynamic adjustment of the TTL value based on whether an immersive scene is to be repeated or otherwise made available for later viewing. For example, one or more immersive scenes may be spooled for cyclically repeating playback (e.g., as online help, training materials, or a carousel of looping content), and these immersive scenes may be marked (e.g., within metadata of their constituent scene video files) such that the digital media machine 110 maintains a constant TTL value after uploading their constituents scene video files. In some example embodiments, each scene video file has its own corresponding TTL value, and the digital media machine 110 dynamically adjusts the TTL values of all scene video files that have not been marked or otherwise indicated as being spooled for cyclically repeating playback.

As another example, one or more immersive scenes may be designated for on-demand playback (e.g., in a video-on-demand context), and such immersive scenes may be marked (e.g., within metadata of their scene video files) such that the digital media machine 110 sets a maximum TTL value or a null TTL value for each scene video file in these immersive scenes, which may have the effect of causing the content distribution network 122 never delete these scene video files and instead keep them ready for distribution at all times on an ongoing basis (e.g., indefinitely).

Dynamic Size of Top-Depicting or Bottom-Depicting Region of Picture Area

Figure 8:
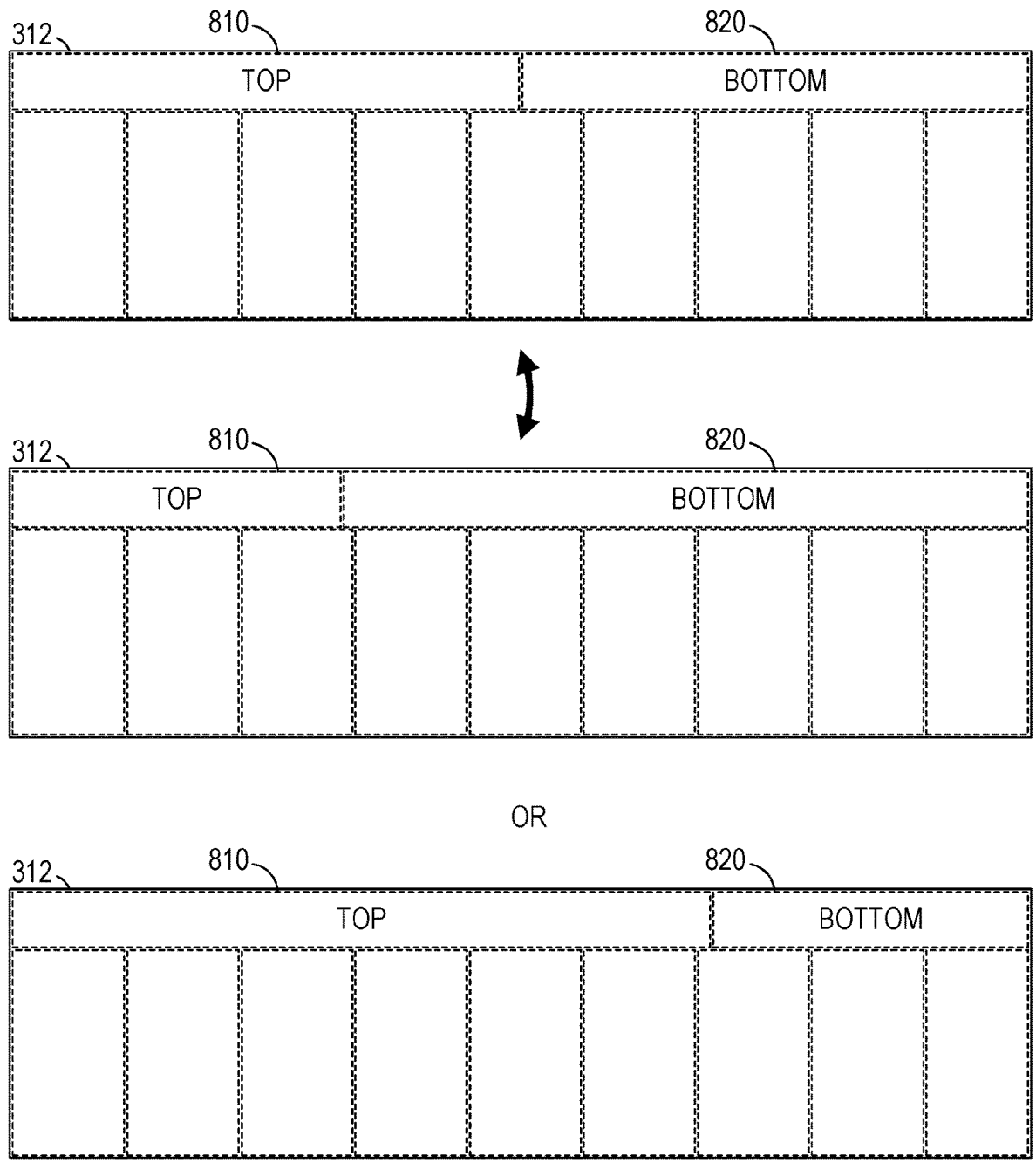
FIG. 8 is a diagram illustrating dynamic adjustment of top or bottom regions of a picture area, according to some example embodiments.

FIG. 8 is a diagram illustrating how the digital media machine 110 dynamically adjusts a top-depicting region 810, a bottom-depicting region 820, or both, of a picture area, such as the picture area 312 (e.g., of the scene video file 310, as discussed above with respect to FIG. 3), according to some example embodiments. The top-depicting region 810, the bottom-depicting region 820, or both, may be dynamically sized while maintaining the size of the picture area 312 constant or while also dynamically sizing the picture area 312 (e.g., as discussed below with respect to FIG. 9).

As shown in FIG. 8, the picture area 312 includes the top-depicting region 810, the bottom-depicting region 820, and a number of regions that each respectively correspond to a different azimuth angle (e.g., 9 regions centered or otherwise aimed at 0, 40, 80, 120, 160, 200, 240, 280, 320 degrees respectively) relative to the front or forward direction of the immersive scene. Each one of these regions may contain image data captured by a different camera (e.g., an upward-facing camera, a downward-facing camera, and cameras aimed at 0, 40, 80, 120, 160, 200, 240, 280, 320 degrees respectively, relative to the front or forward direction of the scene). In particular, the top-depicting region 810 may depict image information captured by an upward-facing camera (e.g., aimed at the sky or at a ceiling), and the bottom-depicting region 820 may depict image information captured by a downward-facing camera (e.g., aimed at the ground or at a floor).

In the top portion of FIG. 8, the picture area 312 is shown with default proportions for the top-depicting region 810 and the bottom-depicting region 820. According to some example embodiments, the top-depicting region 810 and the bottom-depicting region 820 are balanced with respect to each other and have equal areas (e.g., an area ratio of 1:1) within the picture area 312. As noted above, it is common that VR content be less interesting in the top-depicting region 810, the bottom-depicting region 820, or both, and these regions may be treated similarly to other non-foveated portions of the picture area 312 or even have lower resolution (e.g., using "2K" resolution at or near 2048×1080 pixels) than the other non-foveated portions (e.g., using "4K" resolution at or near 3840×2160 pixels) of the picture area 312.

However, some example embodiments of the digital media machine 110 are configured to dynamically adjust the sizes of the top-depicting region 810 and the bottom-depicting region 820 in response to video complexity, video importance, or both. Accordingly, as shown in the middle and bottom portions of FIG. 8, if the digital media machine 110 detects an increase in video complexity within the bottom-depicting region 820 (e.g., above a threshold level of temporal or spatial complexity) or an increase in video importance of the bottom-depicting region 820 (e.g., as indicated by metadata describing viewing directions of main or key events within the immersive scene), the digital media machine 110 may allocate a larger percentage of the picture area 312 to the bottom-depicting region 820 (e.g., at the expense of the top-depicting region 810). This may result in the top-depicting region 810 and the bottom-depicting region 820 to have a top-to-bottom area ratio of, for example, 1:2, 1:3, or 2:5.

Conversely, if the digital media machine 110 detects an increase in video complexity within the top-depicting region 810 (e.g., above a threshold level of temporal or spatial complexity) or an increase in video importance of the top-depicting region 810 (e.g., as indicated by metadata that describes viewing directions of the main or key events within the immersive scene), the digital media machine 110 may allocate a larger percentage of the picture area 312 to the top-depicting region 810 (e.g., at the expense of the bottom-depicting region 820). This may result in the top-depicting region 810 and the bottom-depicting region 822 have a top-to-bottom area ratio of, for example, 2:1, 3:1, or 5:2.

Similarly, if the digital media machine 110 detects that the previously increased video complexity has returned to default levels (e.g., below a threshold level of temporal or spatial complexity) or that the previously increased video importance has returned to default levels (e.g., as indicated by metadata describing viewing directions of the main or key events within the immersive scene), the digital media machine 110 may restore the top-depicting region 810 and the bottom-depicting region 820 to their default settings.

Dynamic Size of Picture Area

Figure 9:
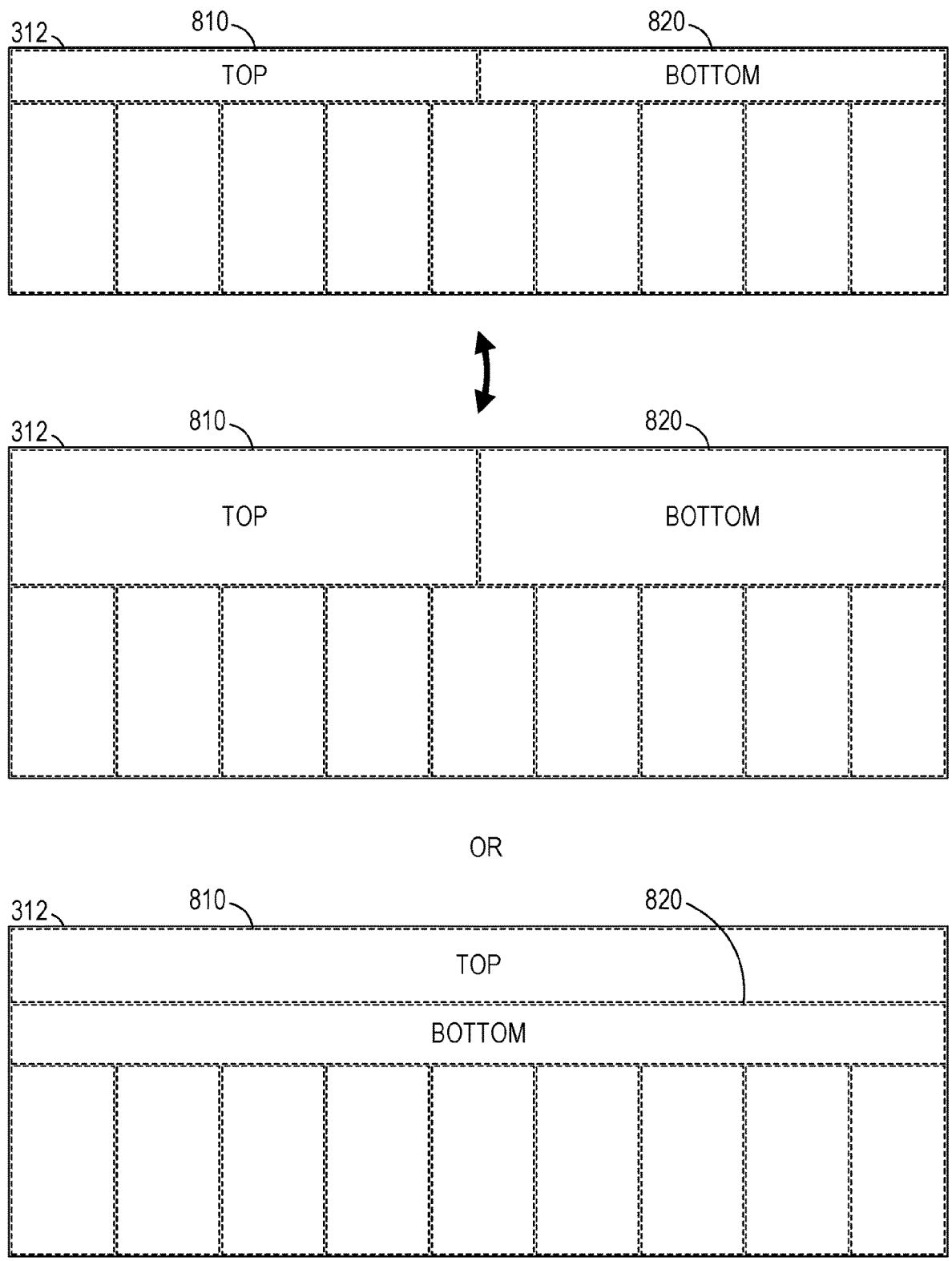
FIG. 9 is a diagram illustrating dynamic adjustment of a picture area, according to some example embodiments.

FIG. 9 is a diagram illustrating how the digital media machine 110 dynamically adjusts the picture area 312 (e.g., of the scene video file 310), according to some example embodiments. The picture area 312 may be dynamically sized, with or without the above-described dynamic sizing of the top-depicting region 810, the bottom-depicting region 820, or any suitable combination thereof (e.g., as discussed above with respect to FIG. 8), and such dynamic sizing of the picture area 312 may be performed based on video complexity, network capacity, or both.

As shown in FIG. 9, the picture area 312 includes the top-depicting region 810, the bottom-depicting region 820, and a number of regions that each respectively correspond to a different azimuth angle (e.g., 9 regions centered or otherwise aimed at 0, 40, 80, 120, 160, 200, 240, 280, 320 degrees respectively) relative to the front or forward direction of the immersive scene. As discussed above, each one of these regions may contain image data captured by a different camera (e.g., an upward-facing camera, a downward-facing camera, and cameras aimed at 0, 40, 80, 120, 160, 200, 240, 280, 320 degrees respectively, relative to the front or forward direction of the scene). In particular, the top-depicting region 810 may depict image information captured by an upward-facing camera (e.g., aimed at the sky or at a ceiling), and the bottom-depicting region 820 may depict image information captured by a downward-facing camera (e.g., aimed at the ground or at a floor).

In the top portion of FIG. 9, the picture area 312 is again shown with default proportions for the top-depicting region 810 and the bottom-depicting region 820. According to some example embodiments, the top-depicting region 810 and the bottom-depicting region 820 are balanced with respect to each other and have equal areas (e.g., an area ratio of 1:1) within the picture area 312. Since it is common that VR content be less interesting in the top-depicting region 810, the bottom-depicting region 820, or both, these regions may be treated similarly to other non-foveated portions of the picture area 312 or even have lower resolution (e.g., using "2K" resolution at or near 2048×1080 pixels) than the other non-foveated portions (e.g., using "4K" resolution at or near 3840×2160 pixels) of the picture area 312.

However, certain example embodiments of the digital media machine 110 are configured to dynamically adjust the size of the picture area 312, such that the sizes of the top-depicting region 810 and the bottom-depicting region 820 have a wider range for their dynamic adjustment (e.g., as described above with respect to FIG. 8 or as described presently with respect to FIG. 9). Accordingly, as shown in the middle and bottom portions of FIG. 9, if the digital media machine 110 detects an increase in video complexity within either or both of the top-depicting region 810 and the bottom-depicting region 820 (e.g., above a threshold level of temporal or spatial complexity), an increase in video importance of either or both of the top-depicting region 810 and the bottom-depicting region 820 (e.g., as indicated by metadata describing viewing directions of main or key events within the immersive scene), an increase in network capacity (e.g., as indicated by detecting an upload data rate that meets or exceeds a threshold level), or any suitable combination thereof, the digital media machine 110 may expand the picture area 312 (e.g., vertically), while also expanding one or both of the top-depicting region 810 and the bottom-depicting region 820. The middle portion of FIG. 9 illustrates vertical resizing of the picture area 312 to accommodate vertical resizing of one or both of the top-depicting region 810 and the bottom-depicting region 820. The bottom portion of FIG. 9 illustrates vertical resizing of the picture area 312 to accommodate horizontal resizing of one or both of the top-depicting region 810 and the bottom-depicting region 820. In some example embodiments, such vertical expansion of the picture area 312 has the effect of doubling the vertical size of one or both of the top-depicting region 810 and the bottom-depicting region 820.

Similarly, if the digital media machine 110 detects that previously increased video complexity has returned to default levels (e.g., below threshold level of temporal or spatial complexity), that previously increased video importance has returned to default levels (e.g., as indicated by metadata describing viewing directions of the main or key events within the immersive scene), that previously increased network capacity has been reduced (e.g., as indicated by detecting an upload rate that falls below a threshold level), or any suitable combination thereof, the digital media machine 110 may shrink the picture area 312 (e.g., vertically), also shrinking one or both of the top-depicting region 810 and the bottom-depicting region 820. This may result in the picture area 312 being restored to the state shown in the top portion of FIG. 9. In some example embodiments, such vertical shrinking of the picture area 312 has the effect of having the vertical size of one or both of the top-depicting region 810 and the bottom-depicting region 820.

According to various example embodiments, one or more of the methodologies described herein may facilitate provision of any one or more of multiple features described herein with respect to virtual-reality content. In particular, such features include directional PIP windows based on viewing direction, directional audio based on viewing direction, user recommendations based on anomalous viewing times of certain visual features in video content, dynamic adjustment of TTL durations prior to requesting deletion of video files uploaded to a content distribution network, dynamic adjustment of durations of video files to upload based on network capacity, dynamic adjustment of quantities of video files per set to upload based on network capacity, dynamic resizing of top-depicting or bottom-depicting regions within the picture areas of sets of video files, dynamic resizing of the picture areas themselves within sets of video files, or any suitable combination thereof. Hence, one or more of the methodologies described herein may facilitate improved user experiences with the virtual-reality content, as well as improved use of hardware resources that deliver such improved user experiences, compared to capabilities of pre-existing systems and methods.

Concurrent Display of Multiple PIP Windows or Multiple Scenes

Figure 10:
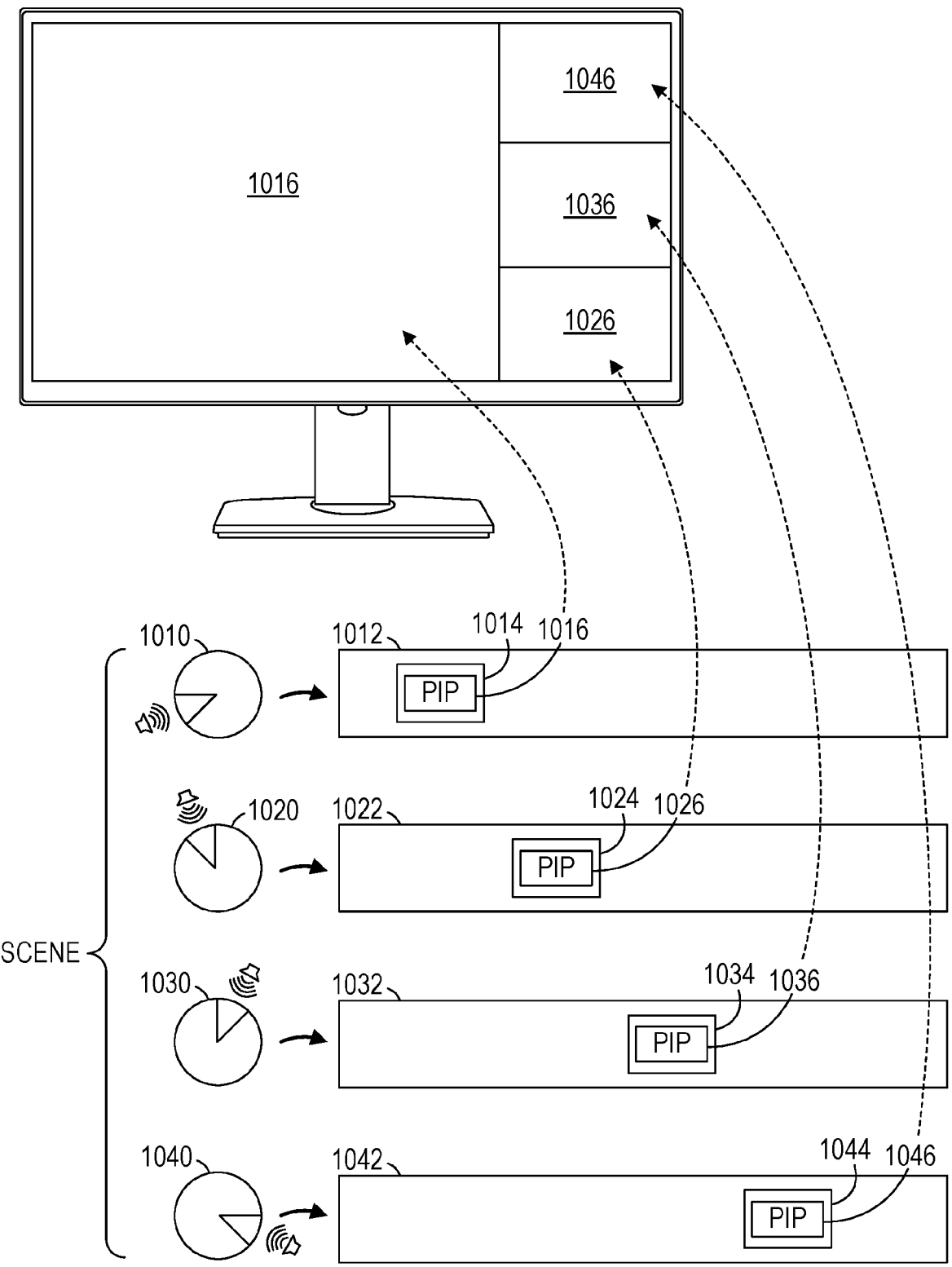
FIG. 10 is a diagram illustrating concurrent PIP windows from a single immersive scene, including a selected primary PIP window and multiple available secondary PIP windows, being displayed together, according to some example embodiments.

FIG. 10 is a diagram illustrating concurrent PIP windows from a single immersive scene, including a selected primary PIP window and multiple available secondary PIP windows, being displayed together on a client device (e.g., a display screen, as illustrated, a smartphone, or a smart television) configured to concurrently present the primary and secondary PIP windows, according to some example embodiments. In the example shown in FIG. 10, a single immersive scene is represented by at least four scene video files 1010, 1020, 1030, and 1040 that all depict the same time span of content, collectively similar to the concurrent video files 200 discussed above. Each individual scene video file (e.g., scene video file 1010, 1020, 1030, or 1040) contains a different foveated region that is aligned with a different corresponding angle of azimuth relative to the viewer's position (e.g., relative to the front or forward direction of the scene). Thus, the scene video file 1010 has a picture area 1012 that includes a foveated region 1014; the scene video file 1020 has a picture area 1022 that includes a foveated region 1024; the scene video file 1030 has a picture area 1032 that includes a foveated region 1034; and the scene video file 1040 has a picture area 1042 that includes a foveated region 1044.

As further shown in FIG. 10, each scene video file's foveated region (e.g., foveated region 1014, 1024, 1034, or 1044) contains a different PIP window. Thus, the foveated region 1014 of the picture area 1012 includes a PIP window 1016; the foveated region 1024 of the picture area 1022 includes a PIP window 1026; the foveated region 1034 of the picture area 132 includes a PIP window 1036; and the foveated region 1044 of the picture area 1042 includes a PIP window 1046. These PIP windows 1016, 1026, 1036, and 1046 are respectively assigned to different regions of the display screen and concurrently (e.g., simultaneously) displayed together on the display screen. As shown in FIG. 10, the PIP window 1016 has been selected (e.g., manually by a viewer or automatically by machine) as a primary PIP window for prominent display in the largest region of the display screen, while the other PIP windows 1026, 1036, and 1046 are secondary PIP windows allocated to the three smaller regions of the display screen for less prominent display to indicate their availability for selection as the primary PIP window.

In some example embodiments, the primary PIP window is selected manually by a viewer. For example, the display screen may be or include a touch-sensitive touchscreen, and the viewer may perform a touch or swipe on one of the smaller regions of the display screen to cause the digital media machine 110 to select the corresponding PIP window (e.g., PIP window 1026, 1036, or 1046) as the new primary PIP window to be prominently displayed in the largest region of the display screen or even more prominently displayed full-screen to the exclusion of the other PIP windows, whereupon the previous primary PIP window (e.g., PIP window 1016) would be reassigned to the touched or swiped smaller region of the display screen and displayed therein or hidden completely from view. As noted above with respect to FIG. 4, each scene video file may include its own corresponding audio track (e.g., with its own corresponding audio mix). Accordingly, the selection of any PIP window as the new primary PIP window may additionally select the corresponding audio track from the same scene video file, such that the audio track for the primary PIP window is presented (e.g., played) concurrently with the display of the primary PIP window in the largest region of the display screen. As also noted above with respect to FIG. 4, the audio tracks from other (e.g., secondary or otherwise non-selected) PIP windows may be attenuated in the selected audio mix, muted in the selected audio mix, or entirely absent from the selected audio track.

Furthermore, although the scene video files 1010, 1020, 1030, and 1040 are all from a single immersive scene, the supplemental video files for their respective PIP windows 1016, 1026, 1036, and 1046 may be unrelated to each other, unrelated to the single immersive scene, or both. For example, the supplemental video files of the PIP windows 1016, 1026, 1036, and 1046 may be individually selected by the viewer (e.g., via a suitable graphical user interface generated by the digital media machine 110 or the display screen and presented on the display screen) and each supplemental video file may be individually assigned by the viewer (e.g., via the graphical user interface) for presentation in its corresponding PIP window. As another example, the supplemental video files may be automatically selected by the digital media machine 110 and automatically assigned to their corresponding PIP windows 1016, 1026, 1036, and 1046. For example, the digital media machine 110 may access (e.g., from one or more video sources via the network 190) four supplemental video files that represent four live or recorded sports events (e.g., a football game, a soccer game, a basketball game, and a hockey game), assign each supplemental video file to a different one of the PIP windows 1016, 1026, 1036, and 1046, and provide the scene video files 1010, 1020, 1030, and 1040 as a prepackaged set of sports media content to the display screen, which may be configured (e.g., via suitable client-side software) to concurrently display the primary PIP window and secondary PIP windows as discussed above.

In certain example embodiments, the primary PIP window is selected automatically by a machine (e.g., by the digital media machine 110, the display screen, or both). For example, the machine may execute or otherwise operate an artificial intelligence engine configured to perform recognition of one or more visual patterns in the supplemental video files of the PIP windows 1016, 1026, 1036, and 1046, and then select the primary PIP window based on such visual pattern recognition. As a more specific example, supposing that the four supplemental video files for the PIP windows 1016, 1026, 1036, and 1046 each represent one of four different (American) football games, the artificial intelligence engine may recognize when a scoring event (e.g., a touchdown or a field goal) has a heightened likelihood of occurrence. This may include detecting that a scrimmage line marker or a first-down marker depicted in one of the supplemental video files has moved inside a team's own 20-yard line (e.g., by using optical character recognition to detect the n-gram "20" and using visual pattern recognition to detect a triangular disambiguation symbol and the relevant marker). Based on this detection, the machine may automatically select the corresponding PIP window displaying the corresponding supplemental video file as the primary PIP window. This may have the effect of dynamically choosing which one of the four supplemental video files will be presented in the largest region of the display screen.

According to various example embodiments, other algorithms are implemented to predict increased likelihoods of a scoring event. For example, the artificial intelligence engine may be configured to predict when the football will reach either team's 20-yard line. As another example, supposing that the four supplemental video files for the PIP windows 1016, 1026, 1036, and 1046 each represents one of four different basketball games, the artificial intelligence engine may be configured to predict when a specific basketball player is likely to score. For example, such a detection may be based on the player's detected position on the basketball court (e.g., outside the 3-point line) in comparison to the player's shooting statistics accessed from a sports database via the network 190).

Figure 11:
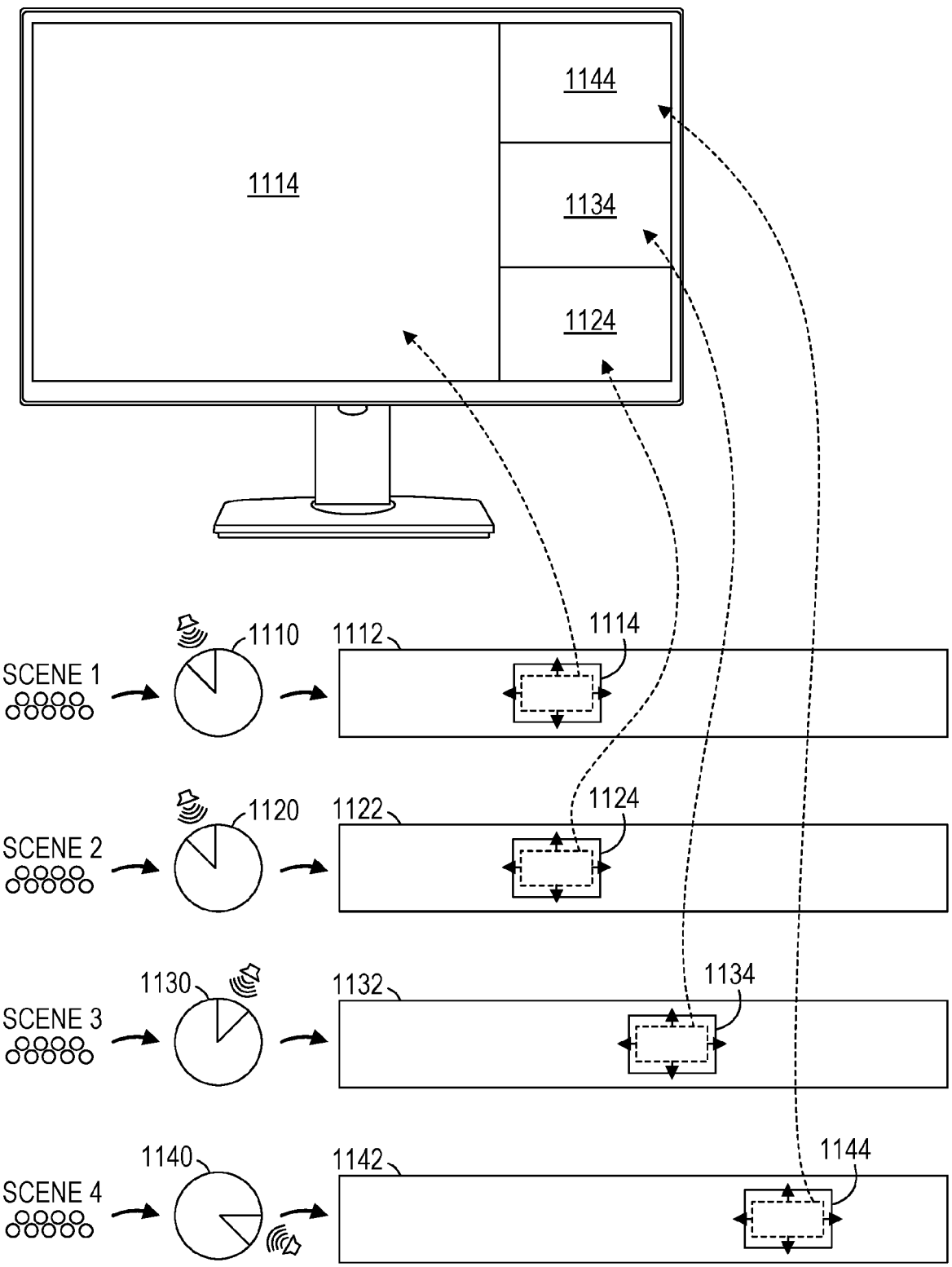
FIG. 11 is a diagram illustrating concurrent immersive scenes, including a selected region from a selected primary immersive scene and multiple available regions from available secondary immersive scenes, being displayed together, according to some example embodiments.

FIG. 11 is a diagram illustrating concurrent immersive scenes, including a selected region from a selected primary immersive scene and multiple available regions from available secondary immersive scenes, being displayed together on a client device (e.g., a display screen, as illustrated, a smartphone, or a smart television), according to some example embodiments. In the example shown in FIG. 11, four separate immersive scenes (e.g., Scene 1, Scene 2, Scene 3, and Scene 4) are sources for the contents shown in the regions of the display screen. Each of the immersive scenes (e.g., Scene 1, 2, 3, or 4) is represented by a set of scene video files, similar to the concurrent video files 200 discussed above. Each individual scene video file within the set contains a different foveated region that is aligned with a different corresponding angle of azimuth relative to the viewer's position (e.g., relative to the front or forward direction of the scene). Thus, the scene video file 1110 from Scene 1 has a picture area 1112 that includes a foveated region 1114; the scene video file 1120 from Scene 2 has a picture area 1122 that includes a foveated region 1124; the scene video file 1130 from Scene 3 has a picture area 1132 that includes a foveated region 1134; and the scene video file 1140 from Scene 4 has a picture area 1142 that includes a foveated region 1144. Since the foveated regions 1114, 1124, 1134, and 1144 come from different immersive scenes, two or more of the foveated regions 1114, 1124, 1134, and 1144 may coincide in their alignment and thus align with the same corresponding angle of azimuth relative to the viewer's position (e.g., relative to the front or forward direction of their respective scenes). As an example of this, FIG. 11 illustrates the scene video file 1110 from Scene 1 coincidently having the same alignment as the scene video file 1120 from Scene 2.

As further shown in FIG. 11, although the entirety of each scene video file's foveated region (e.g., foveated region 1114, 1124, 1134, or 1144) may be assigned to and displayed in a corresponding region of the display screen, the same is true for a portion of the foveated region (e.g., a subregion, which may be selected by the viewer via a controller, such as a headset, a joystick, or a suitable graphical user interface generated by the digital media machine 110 or the display screen and presented on the display screen). These portions (e.g., subregions) of foveated regions are respectively assigned to different regions of the display screen and concurrently (e.g., simultaneously) displayed together on the display screen. As shown in FIG. 11, a portion of the foveated region 1114 has been selected as a primary subregion (e.g., representative of a primary scene) for prominent display in the largest region of the display screen, while other portions of the foveated regions 1124, 1134, and 1144 are secondary subregions (e.g., representative of secondary scenes) allocated to the three smaller regions of the display screen for less prominent display to indicate their availability for selection as the primary subregion.

In various example embodiments, selection of a primary scene (e.g., Scene 1) whose foveated region will provide the primary subregion is performed in a manner similar to that described above with respect to FIG. 10 regarding selection of a primary PIP window. That is, instead of selecting a primary PIP window from among multiple available PIP windows in the picture areas of multiple scene video files within a single set of scene video files for a single immersive scene, a viewer or a machine (e.g., the digital media machine 110, the display screen, or both) may select a primary immersive scene from among multiple available immersive scenes that each has its own corresponding set of scene video files. Accordingly, the selected primary immersive scene becomes the source for a foveated region whose entirety or subregion is assigned to and displayed in the largest region of the display screen or displayed full-screen.

In addition, with the primary scene (e.g., Scene 1) being selected, selection of one of its constituent scene video files may be performed in a manner similar to that described above with respect to FIG. 2 (e.g., based on a selected or otherwise determined viewing direction, which may be specified by azimuth angle and elevation angle, or by azimuth angle only. For example, the viewer may specify the viewing direction by using a controller device, such as a headset, a mouse, a touchscreen, a joystick, or a suitable graphical user interface presented by the display screen or a smartphone. As discussed above with respect to FIG. 2, the scene video file (e.g., scene video file 1010) that is most closely aligned with the specified viewing direction is selected. Accordingly, with the scene video file being selected, its foveated region (e.g., foveated region 1114) or a selected portion thereof is assigned to the largest region of the display screen and displayed therein.

According to various example embodiments, representative scene video files (e.g., scene video files 1120, 1130, and 1140) are selected from the secondary scenes (e.g., Scenes 2, 3, and 4). A representative scene video file may be selected by the viewer or by a machine (e.g., the digital media machine 110, the display screen, or both). For example, the machine may perform the selection randomly, based on a default (e.g., front or forward) direction, based on output from an artificial intelligence engine (e.g., configured to analyze a set of scene video files and make a selection therefrom), or any suitable combination thereof. Similarly, if the entirety of the corresponding foveated region is not shown in the assigned region of the display screen, a representative portion (e.g., subregion) of the foveated region may be selected by the viewer or by the machine. For example, the machine may perform such a selection randomly, based on a default (e.g., centered) portion, based on output from an artificial intelligence engine, or any suitable combination thereof. In some example embodiments, the viewer simultaneously selects both the representative scene video file (e.g., scene video file 1120, 1130, or 1140) and the portion of its foveated region (e.g., foveated region 1124, 1134, or 1144) by using a controller device (e.g., headset, a mouse, a touchscreen, joystick, or suitable graphical user interface presented by the display screen or a smartphone). Accordingly, with the representative scene video file being selected, its foveated region or a selected portion thereof is assigned to one of the smaller regions of the display screen and displayed therein.

When these effects are considered in aggregate, one or more of the methodologies described herein may obviate a need for certain efforts or resources that otherwise would be involved in providing improved user experiences with virtual-reality content. Efforts expended by a user in perceiving or otherwise obtaining such improved user experiences, or by an administrator in hosting or otherwise providing such improved user experiences, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 12:
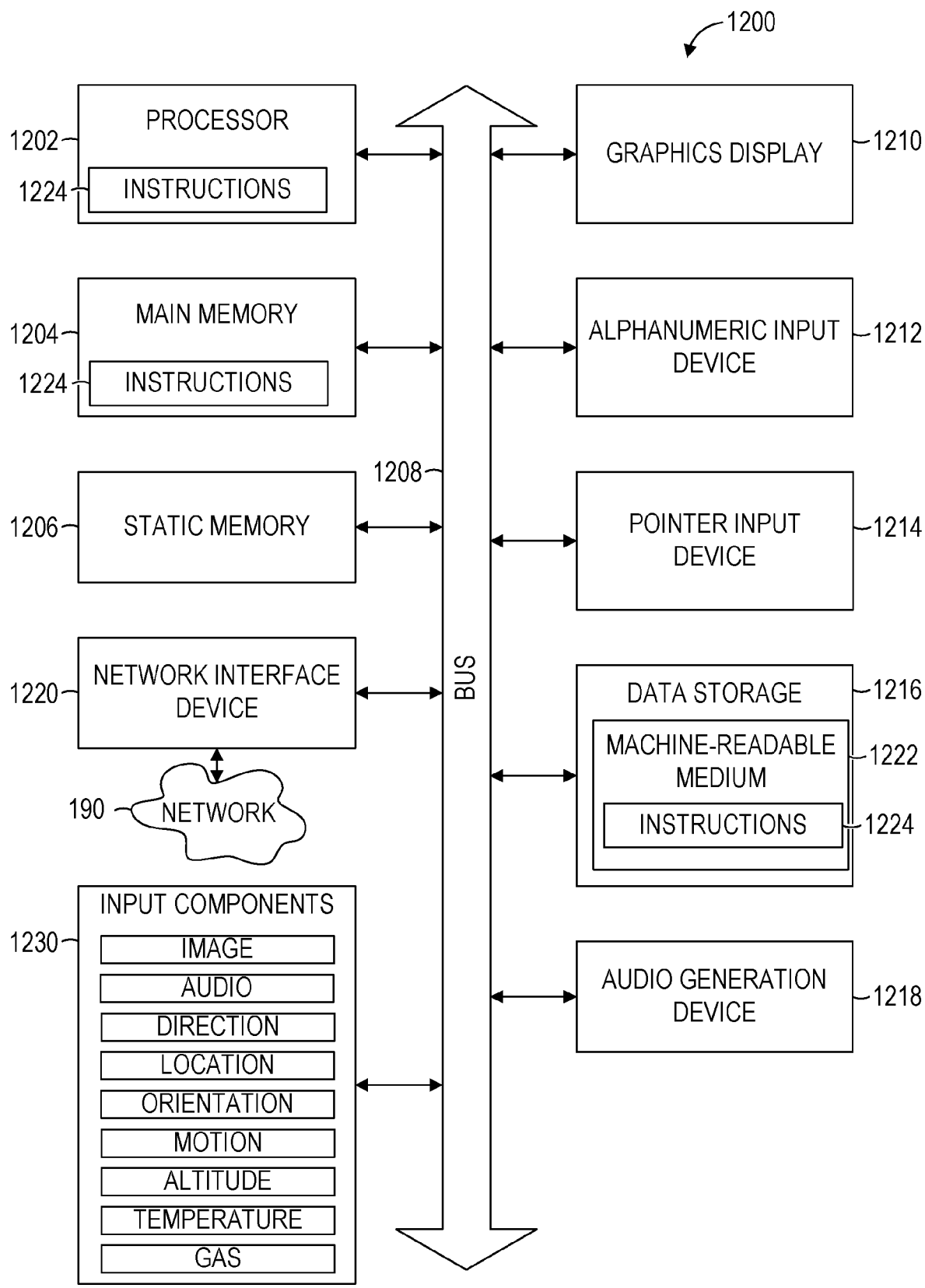
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer, which may be a supercomputer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer (e.g., a supercomputing server), a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., one or more central processing units (CPUs), one or more graphics processing units (GPUs), one or more quantum processing units, one or more digital signal processors (DSPs), one or more application specific integrated circuits (ASICs), one or more radio-frequency integrated circuits (RFICs), or any suitable combination thereof), a main memory 1204, and a static memory 1206, which are configured to communicate with each other via a bus 1208. The processor 1202 contains solid-state digital microcircuits (e.g., electronic, optical, or both) that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein. In some example embodiments, the processor 1202 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1200 with at least the processor 1202, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a pointer input device 1214 (e.g., a mouse, a touchpad, a touchscreen, a trackball, a joystick, a stylus, a motion sensor, an eye tracking device, a data glove, or other pointing instrument), a data storage 1216, an audio generation device 1218 (e.g., a sound card, an amplifier, a speaker, a headphone jack, or any suitable combination thereof), and a network interface device 1220.

The data storage 1216 (e.g., a data storage device) includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the static memory 1206, within the processor 1202 (e.g., within the processor's cache memory), or any suitable combination thereof, before or during execution thereof by the machine 1200. Accordingly, the main memory 1204, the static memory 1206, and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device (e.g., a smart phone, a tablet computer, or a wearable device), and may have one or more additional input components 1230 (e.g., sensors or gauges). Examples of such input components 1230 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1230 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1224 for execution by the machine 1200 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1224).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

accessing, by one or more processors of a machine, a set of concurrent video files that depict a common immersive scene within a common picture area but each corresponds to a different viewing direction and includes a different foveated region that is aligned with the corresponding viewing direction and has higher resolution than a remainder of the common picture area;

modifying, by one or more processors of the machine, at least two of the concurrent video files in the set by incorporating a first picture-in-picture (PIP) window into a first foveated region of a first concurrent video file among the set of concurrent video files and incorporating a second PIP window into a second foveated region of a second concurrent video file among the set of concurrent video files, the first and second PIP windows being respectively aligned with different corresponding first and second viewing directions;

providing, by one or more processors of the machine, the modified first concurrent video file to a client device in response to a first request resultant from the client device being requested to render the common immersive scene in the first viewing direction, the provided first concurrent video file causing the client device to render the first foveated region with the first PIP window; and providing, by one or more processors of the machine, the modified second concurrent video file to the client device in response to a second request resultant from the client device being requested to render the common immersive scene in the second viewing direction, the provided second concurrent video file causing the client device to render the second foveated region with the second PIP window.

A second example provides a method comprising:

accessing, by one or processors of a machine, a set of audio tracks that each correspond to a different viewing direction among a set of viewing directions within a common immersive scene, the set of audio tracks including a first audio track that corresponds to a first viewing direction among the set of viewing directions;

generating, by one or more processors of the machine, a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and providing, by one or more processors of the machine, the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

A third example provides a method comprising:

training, by one or more processors of the machine, a neural network to recognize a set of visual features depicted in a training database of video files;

detecting, by one or more processors of the machine, a set of anomalous viewing times during which a client device of a user was requested to render a set of video files, the detecting of the set of anomalous viewing times being based on a histogram of monitored viewing times during which the client device was requested to render the video files;

identifying, by one or more processors of the machine, a subset of the set of visual features recognizable by the trained neural network by correlating the detected set of anomalous viewing times with the rendered video files and inputting the rendered video files into the trained neural network to thereby recognize the subset of the set of video features in the rendered video files;

generating, by one or more processors of the machine, a viewing preference profile of the user based on the identified subset of the set of visual features, the generated viewing preference profile indicating the identified subset of the set of visual features; and generating and providing, by one or more processors of the machine, a recommendation message to the client device of the user, the recommendation message being generated based on the subset of the set of visual features indicated by the viewing preference profile of the user.

A fourth example provides a method comprising:

accessing, by one or more processors of a machine, a first set of concurrent video files to be uploaded to a content distribution network, the first set of concurrent video files all having a same first duration and all representing a same temporal segment of an immersive scene;

detecting, by one or more processors of the machine, that a measured upload data rate to the content distribution network is below a threshold upload data rate;

in response to the measured upload data rate being below the threshold upload data rate, and by one or more processors of the machine, converting the first set of concurrent video files into multiple sets of concurrent video files, the multiple sets including a second set of concurrent video files that all have a same second duration that is shorter than the first duration;

in further response to the measured upload rate being below the threshold upload data rate, and by one or more processors of the machine, uploading the converted second set of concurrent video files that all have the same second duration that is shorter than the first duration to the content distribution network.

A fifth example provides a method comprising:

accessing, by one or more processors of a machine, a set of concurrent video files to be uploaded to a content distribution network, the set of concurrent video files all having a same duration and all representing a same temporal segment of an immersive scene;

detecting, by one or more processors of the machine, that a measured upload data rate to the content distribution network is below a threshold upload data rate;

in response to the measured upload data rate being below the threshold upload data rate, and by one or more processors of the machine, selecting at least one concurrent video file among the set of concurrent video files for exclusion from being uploaded to the content distribution network, the selecting of the at least one concurrent video file reducing the set of concurrent video files to be uploaded to the content distribution network;

in further response to the measured upload rate being below the threshold upload data rate, and by one or more processors of the machine, uploading the reduced set of concurrent video files to the content distribution network.

A sixth example provides a method comprising:

accessing, by one or more processors of a machine, a set of concurrent video files to be uploaded to a content distribution network, the set of concurrent video files all representing a same temporal segment of an immersive scene and all corresponding to a first time-to-live (TTL) value that specifies a first threshold time span;

detecting, by one or more processors of the machine, that a measured upload data rate to the content distribution network is below a threshold upload data rate;

in response to the measured upload data rate being below the threshold upload data rate, and by one or more processors of the machine, reducing the first TTL value to a second TTL value that is less than the first TTL value;

uploading, by one or more processors of the machine, the set of concurrent video files to the content distribution network; and in further response to the measured upload rate being below the threshold upload rate, and by one or more processors of the machine, causing the content distribution network to delete the uploaded set of concurrent video files based on a time span since the uploading exceeding a second threshold time span specified by the second TTL value.

A seventh example provides a method comprising:

accessing, by one or more processors of a machine, upward-facing video content and downward-facing video content to be included in a common picture area of a set of concurrent video files to all depict a common immersive scene;

determining, by one or more processors of the machine, a size ratio of a top-depicting region of the common picture area to a bottom-depicting region of the common picture area based on at least one of a video complexity analysis of the upward-facing video content, a video complexity analysis of the downward-facing video content, a video importance indicator of the upward-facing video content, or a video importance indicator of the downward-facing video content;

determining, by one or more processors of the machine, at least one first dimension of the top-depicting region of the common picture area and at least one second dimension of the bottom-depicting region of the common picture area, the at least one first and second dimensions being determined based on the size ratio of the top-depicting region of the common picture area to the bottom-depicting region the common picture area; and generating, by one or more processors of the machine, the set of concurrent video files that all depict the common immersive scene within the common picture area, the generating of the set of concurrent video files being based on the determined at least one first and second dimensions of the top-depicting region and the bottom-depicting region respectively.

An eighth example provides a method comprising:

accessing, by one or more processors of a machine, upward-facing video content and downward-facing video content to be included in a common picture area of a set of concurrent video files to all depict a common immersive scene;

determining, by one or more processors of the machine, a size of the common picture area by determining at least one dimension of the common picture area based on at least one of a video complexity analysis of the upward-facing video content, a video complexity analysis of the downward-facing video content, a video importance indicator of the upward-facing video content, a video importance indicator of the downward-facing video content, or a measured upload data rate to a content distribution network;

determining, by one or more processors of the machine, at least one first dimension of the top-depicting region of the common picture area and at least one second dimension of the bottom-depicting region of the common picture area, the at least one first and second dimensions being determined based on the determined size of the common picture area; and generating, by one or more processors of the machine, the set of concurrent video files that all depict the common immersive scene within the common picture area, the generating of the set of concurrent video files being based on the determined at least one first and second dimensions of the top-depicting region and the bottom-depicting region respectively.

A ninth example provides a machine-readable medium (e.g., a non-transitory machine-readable storage medium) comprising instructions that, when executed by one or more processors of a machine, cause the machine to perform operations comprising:

accessing a set of concurrent video files that depict a common immersive scene within a common picture area but each corresponds to a different viewing direction and includes a different foveated region that is aligned with the corresponding viewing direction and has higher resolution than a remainder of the common picture area;

modifying at least two of the concurrent video files in the set by incorporating a first picture-in-picture (PIP) window into a first foveated region of a first concurrent video file among the set of concurrent video files and incorporating a second PIP window into a second foveated region of a second concurrent video file among the set of concurrent video files, the first and second PIP windows being respectively aligned with different corresponding first and second viewing directions;

providing the modified first concurrent video file to a client device in response to a first request resultant from the client device being requested to render the common immersive scene in the first viewing direction, the provided first concurrent video file causing the client device to render the first foveated region with the first PIP window; and providing the modified second concurrent video file to the client device in response to a second request resultant from the client device being requested to render the common immersive scene in the second viewing direction, the provided second concurrent video file causing the client device to render the second foveated region with the second PIP window.

A tenth example provides a machine-readable medium (e.g., a non-transitory machine-readable storage medium) comprising instructions that, when executed by one or more processors of a machine, cause the machine to perform operations comprising:

accessing a set of audio tracks that each correspond to a different viewing direction among a set of viewing directions within a common immersive scene, the set of audio tracks including a first audio track that corresponds to a first viewing direction among the set of viewing directions;

generating a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and providing the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

An eleventh example provides a machine-readable medium (e.g., a non-transitory machine-readable storage medium) comprising instructions that, when executed by one or more processors of a machine, cause the machine to perform operations comprising:

training a neural network to recognize a set of visual features depicted in a training database of video files;

detecting a set of anomalous viewing times during which a client device of a user was requested to render a set of video files, the detecting of the set of anomalous viewing times being based on a histogram of monitored viewing times during which the client device was requested to render the video files;

identifying a subset of the set of visual features recognizable by the trained neural network by correlating the detected set of anomalous viewing times with the rendered video files and inputting the rendered video files into the trained neural network to thereby recognize the subset of the set of video features in the rendered video files;

generating a viewing preference profile of the user based on the identified subset of the set of visual features, the generated viewing preference profile indicating the identified subset of the set of visual features; and generating and providing a recommendation message to the client device of the user, the recommendation message being generated based on the subset of the set of visual features indicated by the viewing preference profile of the user.

A twelfth example provides a machine-readable medium (e.g., a non-transitory machine-readable storage medium) comprising instructions that, when executed by one or more processors of a machine, cause the machine to perform operations comprising:

accessing a first set of concurrent video files to be uploaded to a content distribution network, the first set of concurrent video files all having a same first duration and all representing a same temporal segment of an immersive scene;

detecting that a measured upload data rate to the content distribution network is below a threshold upload data rate;

in response to the measured upload data rate being below the threshold upload data rate, converting the first set of concurrent video files into multiple sets of concurrent video files, the multiple sets including a second set of concurrent video files that all have a same second duration that is shorter than the first duration;

in further response to the measured upload rate being below the threshold upload data rate, uploading the converted second set of concurrent video files that all have the same second duration that is shorter than the first duration to the content distribution network.

A thirteenth example provides a machine-readable medium (e.g., a non-transitory machine-readable storage medium) comprising instructions that, when executed by one or more processors of a machine, cause the machine to perform operations comprising:

accessing a set of concurrent video files to be uploaded to a content distribution network, the set of concurrent video files all having a same duration and all representing a same temporal segment of an immersive scene;

detecting that a measured upload data rate to the content distribution network is below a threshold upload data rate;

in response to the measured upload data rate being below the threshold upload data rate, selecting at least one concurrent video file among the set of concurrent video files for exclusion from being uploaded to the content distribution network, the selecting of the at least one concurrent video file reducing the set of concurrent video files to be uploaded to the content distribution network;

in further response to the measured upload rate being below the threshold upload data rate, uploading the reduced set of concurrent video files to the content distribution network.

A fourteenth example provides a machine-readable medium (e.g., a non-transitory machine-readable storage medium) comprising instructions that, when executed by one or more processors of a machine, cause the machine to perform operations comprising:

accessing a set of concurrent video files to be uploaded to a content distribution network, the set of concurrent video files all representing a same temporal segment of an immersive scene and all corresponding to a first time-to-live (TTL) value that specifies a first threshold time span;

detecting that a measured upload data rate to the content distribution network is below a threshold upload data rate;

in response to the measured upload data rate being below the threshold upload data rate, reducing the first TTL value to a second TTL value that is less than the first TTL value;

uploading the set of concurrent video files to the content distribution network; and in further response to the measured upload rate being below the threshold upload rate causing the content distribution network to delete the uploaded set of concurrent video files based on a time span since the uploading exceeding a second threshold time span specified by the second TTL value.

A fifteenth example provides a machine-readable medium (e.g., a non-transitory machine-readable storage medium) comprising instructions that, when executed by one or more processors of a machine, cause the machine to perform operations comprising:

accessing upward-facing video content and downward-facing video content to be included in a common picture area of a set of concurrent video files to all depict a common immersive scene;

determining a size ratio of a top-depicting region of the common picture area to a bottom-depicting region of the common picture area based on at least one of a video complexity analysis of the upward-facing video content, a video complexity analysis of the downward-facing video content, a video importance indicator of the upward-facing video content, or a video importance indicator of the downward-facing video content;

determining at least one first dimension of the top-depicting region of the common picture area and at least one second dimension of the bottom-depicting region of the common picture area, the at least one first and second dimensions being determined based on the size ratio of the top-depicting region of the common picture area to the bottom-depicting region the common picture area; and generating the set of concurrent video files that all depict the common immersive scene within the common picture area, the generating of the set of concurrent video files being based on the determined at least one first and second dimensions of the top-depicting region and the bottom-depicting region respectively.

A sixteenth example provides a machine-readable medium (e.g., a non-transitory machine-readable storage medium) comprising instructions that, when executed by one or more processors of a machine, cause the machine to perform operations comprising:

accessing upward-facing video content and downward-facing video content to be included in a common picture area of a set of concurrent video files to all depict a common immersive scene;

determining a size of the common picture area by determining at least one dimension of the common picture area based on at least one of a video complexity analysis of the upward-facing video content, a video complexity analysis of the downward-facing video content, a video importance indicator of the upward-facing video content, a video importance indicator of the downward-facing video content, or a measured upload data rate to a content distribution network;

determining at least one first dimension of the top-depicting region of the common picture area and at least one second dimension of the bottom-depicting region of the common picture area, the at least one first and second dimensions being determined based on the determined size of the common picture area; and generating the set of concurrent video files that all depict the common immersive scene within the common picture area, the generating of the set of concurrent video files being based on the determined at least one first and second dimensions of the top-depicting region and the bottom-depicting region respectively.

A seventeenth example provides a system (e.g., a computer system) comprising:

one or more processors; and a memory storing instructions that, when executed by at least one processor among the one or more processors, cause the system to perform operations comprising:

accessing a set of concurrent video files that depict a common immersive scene within a common picture area but each corresponds to a different viewing direction and includes a different foveated region that is aligned with the corresponding viewing direction and has higher resolution than a remainder of the common picture area;

modifying at least two of the concurrent video files in the set by incorporating a first picture-in-picture (PIP) window into a first foveated region of a first concurrent video file among the set of concurrent video files and incorporating a second PIP window into a second foveated region of a second concurrent video file among the set of concurrent video files, the first and second PIP windows being respectively aligned with different corresponding first and second viewing directions;

providing the modified first concurrent video file to a client device in response to a first request resultant from the client device being requested to render the common immersive scene in the first viewing direction, the provided first concurrent video file causing the client device to render the first foveated region with the first PIP window; and providing the modified second concurrent video file to the client device in response to a second request resultant from the client device being requested to render the common immersive scene in the second viewing direction, the provided second concurrent video file causing the client device to render the second foveated region with the second PIP window.

An eighteenth example provides a system (e.g., a computer system) comprising:

one or more processors; and a memory storing instructions that, when executed by at least one processor among the one or more processors, cause the system to perform operations comprising:

accessing a set of audio tracks that each correspond to a different viewing direction among a set of viewing directions within a common immersive scene, the set of audio tracks including a first audio track that corresponds to a first viewing direction among the set of viewing directions;

generating a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and providing the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

A nineteenth example provides a system (e.g., a computer system) comprising:

one or more processors; and a memory storing instructions that, when executed by at least one processor among the one or more processors, cause the system to perform operations comprising:

training a neural network to recognize a set of visual features depicted in a training database of video files;

detecting a set of anomalous viewing times during which a client device of a user was requested to render a set of video files, the detecting of the set of anomalous viewing times being based on a histogram of monitored viewing times during which the client device was requested to render the video files;

identifying a subset of the set of visual features recognizable by the trained neural network by correlating the detected set of anomalous viewing times with the rendered video files and inputting the rendered video files into the trained neural network to thereby recognize the subset of the set of video features in the rendered video files; generating a viewing preference profile of the user based on the identified subset of the set of visual features, the generated viewing preference profile indicating the identified subset of the set of visual features; and generating and providing a recommendation message to the client device of the user, the recommendation message being generated based on the subset of the set of visual features indicated by the viewing preference profile of the user.

A twentieth example provides a system (e.g., a computer system) comprising:

one or more processors; and a memory storing instructions that, when executed by at least one processor among the one or more processors, cause the system to perform operations comprising:

accessing a first set of concurrent video files to be uploaded to a content distribution network, the first set of concurrent video files all having a same first duration and all representing a same temporal segment of an immersive scene;

detecting that a measured upload data rate to the content distribution network is below a threshold upload data rate;

in response to the measured upload data rate being below the threshold upload data rate, converting the first set of concurrent video files into multiple sets of concurrent video files, the multiple sets including a second set of concurrent video files that all have a same second duration that is shorter than the first duration;

in further response to the measured upload rate being below the threshold upload data rate, uploading the converted second set of concurrent video files that all have the same second duration that is shorter than the first duration to the content distribution network.

A twenty-first example provides a system (e.g., a computer system) comprising:

one or more processors; and a memory storing instructions that, when executed by at least one processor among the one or more processors, cause the system to perform operations comprising:

accessing a set of concurrent video files to be uploaded to a content distribution network, the set of concurrent video files all having a same duration and all representing a same temporal segment of an immersive scene;

detecting that a measured upload data rate to the content distribution network is below a threshold upload data rate;

in response to the measured upload data rate being below the threshold upload data rate, selecting at least one concurrent video file among the set of concurrent video files for exclusion from being uploaded to the content distribution network, the selecting of the at least one concurrent video file reducing the set of concurrent video files to be uploaded to the content distribution network;

in further response to the measured upload rate being below the threshold upload data rate, uploading the reduced set of concurrent video files to the content distribution network.

A twenty-second example provides a system (e.g., a computer system) comprising:

one or more processors; and a memory storing instructions that, when executed by at least one processor among the one or more processors, cause the system to perform operations comprising:

accessing a set of concurrent video files to be uploaded to a content distribution network, the set of concurrent video files all representing a same temporal segment of an immersive scene and all corresponding to a first time-to-live (TTL) value that specifies a first threshold time span;

detecting that a measured upload data rate to the content distribution network is below a threshold upload data rate;

in response to the measured upload data rate being below the threshold upload data rate, reducing the first TTL value to a second TTL value that is less than the first TTL value;

uploading the set of concurrent video files to the content distribution network; and in further response to the measured upload rate being below the threshold upload rate causing the content distribution network to delete the uploaded set of concurrent video files based on a time span since the uploading exceeding a second threshold time span specified by the second TTL value.

A twenty-third example provides a system (e.g., a computer system) comprising:

one or more processors; and a memory storing instructions that, when executed by at least one processor among the one or more processors, cause the system to perform operations comprising:

accessing upward-facing video content and downward-facing video content to be included in a common picture area of a set of concurrent video files to all depict a common immersive scene;

determining a size ratio of a top-depicting region of the common picture area to a bottom-depicting region of the common picture area based on at least one of a video complexity analysis of the upward-facing video content, a video complexity analysis of the downward-facing video content, a video importance indicator of the upward-facing video content, or a video importance indicator of the downward-facing video content;

determining at least one first dimension of the top-depicting region of the common picture area and at least one second dimension of the bottom-depicting region of the common picture area, the at least one first and second dimensions being determined based on the size ratio of the top-depicting region of the common picture area to the bottom-depicting region the common picture area; and generating the set of concurrent video files that all depict the common immersive scene within the common picture area, the generating of the set of concurrent video files being based on the determined at least one first and second dimensions of the top-depicting region and the bottom-depicting region respectively.

A twenty-fourth example provides a system (e.g., a computer system) comprising:
one or more processors; and
a memory storing instructions that, when executed by at least one processor among the one or more processors, cause the system to perform operations comprising:
accessing upward-facing video content and downward-facing video content to be included in a common picture area of a set of concurrent video files to all depict a common immersive scene;
determining a size of the common picture area by determining at least one dimension of the common picture area based on at least one of a video complexity analysis of the upward-facing video content, a video complexity analysis of the downward-facing video content, a video importance indicator of the upward-facing video content, a video importance indicator of the downward-facing video content, or a measured upload data rate to a content distribution network;
determining at least one first dimension of the top-depicting region of the common picture area and at least one second dimension of the bottom-depicting region of the common picture area, the at least one first and second dimensions being determined based on the determined size of the common picture area; and
generating the set of concurrent video files that all depict the common immersive scene within the common picture area, the generating of the set of concurrent video files being based on the determined at least one first and second dimensions of the top-depicting region and the bottom-depicting region respectively.

A twenty-fifth example provides a method comprising:
accessing, by one or more processors of a machine, a plurality of concurrent video files that each depict a corresponding picture area that includes a corresponding foveated region that is aligned with a corresponding viewing direction and has higher resolution than a remainder of the corresponding picture area;
determining, by one or more processors of the machine, that a first concurrent video file among the plurality of concurrent video files is a selected primary concurrent video file and that a second concurrent video file among the plurality of concurrent video files is a non-selected secondary concurrent video file;
assigning, by one or more processors of the machine, at least a portion of the corresponding foveated region of the selected primary concurrent video file to a primary region of a display screen, the primary region being larger in area than a secondary region of the display screen;
assigning, by one or more processors of the machine, at least a portion of the corresponding foveated region of the non-selected secondary concurrent video file to the secondary region of the display screen; and
causing, by one or more processors of the machine, the display screen to concurrently present the assigned portion of the corresponding foveated region of the selected primary concurrent video file in the primary region of the display screen and present the assigned portion of the corresponding foveated region of the non-selected secondary concurrent video file in the secondary region of the display screen.

A twenty-sixth example provides a machine-readable medium (e.g., a non-transitory machine-readable storage medium) comprising instructions that, when executed by one or more processors of a machine, cause the machine to perform operations comprising:
accessing a plurality of concurrent video files that each depict a corresponding picture area that includes a corresponding foveated region that is aligned with a corresponding viewing direction and has higher resolution than a remainder of the corresponding picture area;
determining that a first concurrent video file among the plurality of concurrent video files is a selected primary concurrent video file and that a second concurrent video file among the plurality of concurrent video files is a non-selected secondary concurrent video file;
assigning at least a portion of the corresponding foveated region of the selected primary concurrent video file to a primary region of a display screen, the primary region being larger in area than a secondary region of the display screen;
assigning at least a portion of the corresponding foveated region of the non-selected secondary concurrent video file to the secondary region of the display screen; and
causing the display screen to concurrently present the assigned portion of the corresponding foveated region of the selected primary concurrent video file in the primary region of the display screen and present the assigned portion of the corresponding foveated region of the non-selected secondary concurrent video file in the secondary region of the display screen.

A twenty-seventh example provides a system (e.g., a computer system) comprising:
one or more processors; and
a memory storing instructions that, when executed by at least one processor among the one or more processors, cause the system to perform operations comprising:
accessing a plurality of concurrent video files that each depict a corresponding picture area that includes a corresponding foveated region that is aligned with a corresponding viewing direction and has higher resolution than a remainder of the corresponding picture area;
determining that a first concurrent video file among the plurality of concurrent video files is a selected primary concurrent video file and that a second concurrent video file among the plurality of concurrent video files is a non-selected secondary concurrent video file;
assigning at least a portion of the corresponding foveated region of the selected primary concurrent video file to a primary region of a display screen, the primary region being larger in area than a secondary region of the display screen;
assigning at least a portion of the corresponding foveated region of the non-selected secondary concurrent video file to the secondary region of the display screen; and
causing the display screen to concurrently present the assigned portion of the corresponding foveated region of the selected primary concurrent video file in the primary region of the display screen and present the assigned portion of the corresponding foveated region of the non-selected secondary concurrent video file in the secondary region of the display screen.

What is claimed is:
1. A method comprising:
accessing, by one or processors of a machine, a set of audio tracks that each correspond to a different viewing direction among a set of viewing directions within a common immersive scene, the set of audio tracks including a first audio track that corresponds to a first viewing direction among the set of viewing directions;
generating, by one or more processors of the machine, a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and providing, by one or more processors of the machine, the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

2. The method of claim 1, wherein:
the first concurrent video file in the set of concurrent video files includes a first foveated region that includes a first picture-in-picture (PIP) window; and
the first audio track that corresponds to the first viewing direction corresponds to the first foveated region but not to the first PIP window.

3. The method of claim 1, wherein:
the first concurrent video file in the set of concurrent video files includes a first foveated region that includes a first picture-in-picture (PIP) window; and
the first audio track that corresponds to the first viewing direction corresponds to the first PIP window but not to the first foveated region.

4. The method of claim 1, wherein:
the first concurrent video file in the set of concurrent video files includes a first foveated region that includes a first picture-in-picture (PIP) window; and
the first audio track that corresponds to the first viewing direction corresponds to both the first foveated region and the first PIP window.

5. The method of claim 1, wherein:
the set of concurrent video files includes a second concurrent video file that includes a second audio mix aligned with a second viewing direction among the set of viewing directions, the second audio mix attenuating included audio tracks except a second audio track that corresponds to the second viewing direction.

6. The method of claim 1, wherein:
the set of concurrent video files includes a second concurrent video file that includes a second audio mix aligned with a second viewing direction among the set of viewing directions, the second audio mix omitting the first audio track that corresponds to the first viewing direction.

7. The method of claim 1, wherein:
the set of concurrent video files includes a second concurrent video file that includes a second audio mix aligned with a second viewing direction among the set of viewing directions, the second audio mix muting the first audio track that corresponds to the first viewing direction.

8. A non-transitory machine-readable storage medium comprising instructions that, when executed by one or more processors of a machine, cause the machine to perform operations comprising:
accessing a set of audio tracks that each correspond to a different viewing direction among a set of viewing directions within a common immersive scene, the set of audio tracks including a first audio track that corresponds to a first viewing direction among the set of viewing directions;

generating a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and providing the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

9. The non-transitory machine-readable storage medium of claim 8, wherein:
the first concurrent video file in the set of concurrent video files includes a first foveated region that includes a first picture-in-picture (PIP) window; and
the first audio track that corresponds to the first viewing direction corresponds to the first foveated region but not to the first PIP window.

10. The non-transitory machine-readable storage medium of claim 8, wherein:
the first concurrent video file in the set of concurrent video files includes a first foveated region that includes a first picture-in-picture (PIP) window; and
the first audio track that corresponds to the first viewing direction corresponds to the first PIP window but not to the first foveated region.

11. The non-transitory machine-readable storage medium of claim 8, wherein:
the first concurrent video file in the set of concurrent video files includes a first foveated region that includes a first picture-in-picture (PIP) window; and
the first audio track that corresponds to the first viewing direction corresponds to both the first foveated region and the first PIP window.

12. The non-transitory machine-readable storage medium of claim 8, wherein:
the set of concurrent video files includes a second concurrent video file that includes a second audio mix aligned with a second viewing direction among the set of viewing directions, the second audio mix attenuating included audio tracks except a second audio track that corresponds to the second viewing direction.

13. The non-transitory machine-readable storage medium of claim 8, wherein:
the set of concurrent video files includes a second concurrent video file that includes a second audio mix aligned with a second viewing direction among the set of viewing directions, the second audio mix omitting the first audio track that corresponds to the first viewing direction.

14. The non-transitory machine-readable storage medium of claim 8, wherein:
the set of concurrent video files includes a second concurrent video file that includes a second audio mix aligned with a second viewing direction among the set of viewing directions, the second audio mix muting the first audio track that corresponds to the first viewing direction.

15. A system comprising:
one or more processors; and
a memory storing instructions that, when executed by at least one processor among the one or more processors, cause the system to perform operations comprising:
accessing a set of audio tracks that each correspond to a different viewing direction among a set of viewing directions within a common immersive scene, the set of audio tracks including a first audio track that corresponds to a first viewing direction among the set of viewing directions;
generating a set of concurrent video files that depict the common immersive scene but each corresponds to a different viewing direction among the set of viewing directions and each includes a different audio mix that is aligned with the corresponding viewing direction, the set of concurrent video files including a first concurrent video file that includes a first audio mix aligned with the first viewing direction, the first audio mix attenuating included audio tracks except the first audio track that corresponds to the first viewing direction; and
providing the first concurrent video file to a client device in response to a request resultant from the client device being requested to render the common immersive scene in the first viewing direction, the provided first concurrent file causing the client device to play the first audio mix that attenuates included audio tracks except the first audio track that corresponds to the first viewing direction.

16. The system of claim 15, wherein:
the first concurrent video file in the set of concurrent video files includes a first foveated region that includes a first picture-in-picture (PIP) window; and
the first audio track that corresponds to the first viewing direction corresponds to the first foveated region but not to the first PIP window.

17. The system of claim 15, wherein:
the first concurrent video file in the set of concurrent video files includes a first foveated region that includes a first picture-in-picture (PIP) window; and
the first audio track that corresponds to the first viewing direction corresponds to the first PIP window but not to the first foveated region.

18. The system of claim 15, wherein:
the set of concurrent video files includes a second concurrent video file that includes a second audio mix aligned with a second viewing direction among the set of viewing directions, the second audio mix attenuating included audio tracks except a second audio track that corresponds to the second viewing direction.

19. The system of claim 15, wherein:
the set of concurrent video files includes a second concurrent video file that includes a second audio mix aligned with a second viewing direction among the set of viewing directions, the second audio mix omitting the first audio track that corresponds to the first viewing direction.

20. The system of claim 15, wherein:
the set of concurrent video files includes a second concurrent video file that includes a second audio mix aligned with a second viewing direction among the set of viewing directions, the second audio mix muting the first audio track that corresponds to the first viewing direction.

* * * * *

UNITED STATES PATENT AND TRADEMARK OFFICE
CERTIFICATE OF CORRECTION

PATENT NO. : 11,589,110 B2
APPLICATION NO. : 17/723840
DATED : February 21, 2023
INVENTOR(S) : Ha et al.

Page 1 of 1

It is certified that error appears in the above-identified patent and that said Letters Patent is hereby corrected as shown below:

In the Specification

Column 15, Line 65, delete "122" and insert --120-- therefor

Column 19, Line 32, delete "132" and insert --1032-- therefor

Signed and Sealed this
Ninth Day of May, 2023

Katherine Kelly Vidal
*Director of the United States Patent and Trademark Office*